US007738743B2

(12) United States Patent
Hino

(10) Patent No.: US 7,738,743 B2
(45) Date of Patent: Jun. 15, 2010

(54) IMAGE READING SYSTEM

(75) Inventor: Makoto Hino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1113 days.

(21) Appl. No.: 11/262,752

(22) Filed: Nov. 1, 2005

(65) Prior Publication Data

US 2006/0098901 A1    May 11, 2006

(30) Foreign Application Priority Data

Nov. 2, 2004    (JP)    ............... 2004-319838

(51) Int. Cl.
*G06K 9/60*    (2006.01)

(52) U.S. Cl. ............... 382/306; 382/100; 382/232; 382/240; 713/176; 713/179; 380/51; 380/54

(58) Field of Classification Search ............... 382/137, 382/139, 140, 305, 306; 358/3.28, 539
See application file for complete search history.

(56) References Cited

U.S. PATENT DOCUMENTS

| | | | | |
|---|---|---|---|---|
| 5,225,997 A | * | 7/1993 | Lederer et al. ............... 702/185 |
| 5,490,217 A | * | 2/1996 | Wang et al. ............... 380/51 |
| 5,696,365 A | * | 12/1997 | Ukai et al. ............... 235/375 |
| 5,848,426 A | * | 12/1998 | Wang et al. ............... 715/210 |
| 6,427,020 B1 | * | 7/2002 | Rhoads ............... 382/100 |
| 6,827,279 B2 | | 12/2004 | Teraura |
| 7,031,494 B2 | * | 4/2006 | Ray et al. ............... 382/100 |
| 7,128,270 B2 | * | 10/2006 | Silverbrook et al. ... 235/472.01 |
| 2005/0117928 A1 | | 6/2005 | Hino |

FOREIGN PATENT DOCUMENTS

| | | |
|---|---|---|
| JP | 2002-337426 | 11/2002 |
| JP | 2004-88584 | 3/2004 |

* cited by examiner

*Primary Examiner*—Yosef Kassa
(74) *Attorney, Agent, or Firm*—Oblon, Spivak, McClelland, Maier & Neustadt, L.L.P.

(57) ABSTRACT

An image reading system is disclosed that has an image information reading unit for reading optical information on a manuscript, and an image outputting unit for outputting the optical information read by the image information reading unit to a recording medium. The system includes
 an IC tag information reading unit for reading IC tag information held by an IC tag provided on the manuscript,
 an IC tag information outputting unit for outputting the IC tag information read by the IC tag information reading unit to the recording medium,
 a conversion unit for converting the IC tag information into coded image data, and
 a control unit for controlling outputting of the coded image data.

20 Claims, 29 Drawing Sheets

FIG.7

| CLASSIFICATION NUMBER |
|---|
| DATE |
| AUTHOR |
| REVISION DATE |
| AFFILIATION |
| APPLICATION USED |
| OUTPUT MACHINE |
| SECRECY LEVEL |
| URL |
| |

FIG.8

| CLASSIFICATION NUMBER |
|---|
| DATE |
| AUTHOR |
| REVISION DATE |
| AFFILIATION |
| APPLICATION USED |
| OUTPUT MACHINE |
| SECRECY LEVEL |
| URL |
| COPYING HISTORY |
| |

IMAGE READING SYSTEM

BACKGROUND OF THE INVENTION

1. Field of the Invention

The present invention generally relates to an image reading system, and especially relates to an image reading system that processes IC tag information held by an IC tag that is installed on a manuscript.

2. Description of the Related Art

Generally, if an IC tag is provided on an object, such as documents and books, management of the object can be electronically processed. Advantages in this case include that labor-saving of the management is attained, and that versatile management is possible, i.e., not only by control numbers as conventionally practiced, but also by dates and authors.

However, since information held by the IC tag of an original manuscript cannot be copied when copying the original manuscript with a usual recording medium without an IC tag, a problem is in that the electronic management of the copied document is not available. Although an IC tag containing management information can be attached to the copied document, the information held by the IC tag of the original manuscript is not copied, that is, the problem remains.

A conventional image reading system for reading a manuscript on which an IC tag is provided is disclosed by Patent Reference 1.

Therein, when an IC tag that holds information is detected on a manuscript that is read, a user is informed of the fact, and one of or both the manuscript and the tag information is/are output according to directions of the user. Further, outputting operations are differentiated according to an attribute of the information, i.e., depending on whether the information can be output as an image (such as image data and text data), or the information cannot be output as an image (such as voice data).

[Patent Reference 1] JPA 2004-88584

DESCRIPTION OF THE INVENTION

Problem(s) to be Solved by the Invention

Nevertheless, the problem of the information held by the IC tag not being copied when the original manuscript with an IC tag is copied onto a usual recording medium without an IC tag remains. Further, although printable data held by the IC tag are output by the image reading system disclosed by Patent Reference 1, voice data and the like are not copied.

SUMMARY OF THE INVENTION

The present invention is made in view of the problems described above, and aims at offering an image reading system that is capable of copying IC tag information, avoiding the IC tag information not being copied without spoiling information of the manuscript as much as possible when the manuscript having an IC tag is copied.

The present invention provides an image reading system that substantially obviates one or more of the problems caused by the limitations and disadvantages of the related art.

Features of the present invention are set forth in the description that follows, and in part will become apparent from the description and the accompanying drawings, or may be learned by practice of the invention according to the teachings provided in the description. Problem solutions provided by the present invention will be realized and attained by an image reading system particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides an image reading system as follows.

Means for Solving the Problem

According to an aspect (first aspect) of the present invention, the image reading system having an image information reading unit for reading optical information of a manuscript, and an image outputting unit for outputting the optical information read by the image information reading unit to a recording medium, includes an IC tag information reading unit for reading IC tag information held by an IC tag provided on the manuscript, an IC tag information outputting unit for outputting the IC tag information read by the IC tag information reading unit to the recording medium, a conversion unit for converting the IC tag information into coded image data, and a control unit for controlling outputting of the coded image data.

According to another aspect (second aspect) of the present invention, the image reading system having an image information reading unit for reading optical information of a manuscript, and an image outputting unit for outputting the optical information read by the image information reading unit to a recording medium, includes a tag information detecting unit for detecting whether tag information embedded as an image is provided on the manuscript, and a recording unit for recording the tag information in an IC tag prepared on the recording medium according to a detection result of the tag information detecting unit.

Another aspect (third aspect) of the present invention provides the image reading system as described in the first aspect, wherein the coded image data are one of bar code data and digital watermark data.

Another aspect (fourth aspect) of the present invention provides the image reading system as described in the first aspect, further including a compounding unit for compounding the optical information of the manuscript and the coded image data (representing the converted IC tag information), and for outputting the compounded image data to the recording medium, and a calculating unit for computing an amount of overlap between an area of the optical information and an area of the coded image data when the areas of the optical information and the image data that are compounded by the compounding unit overlap, and for adjusting the dimensions of one of the areas of the optical information and the coded image data according to a calculation result of the calculating unit.

Another aspect (fifth aspect) of the present invention provides the image reading system as described in the first aspect, further including, a character attribute changing unit for changing an attribute of characters held by the IC tag information, wherein the conversion unit changes the IC tag information into the coded image data according to the change carried out by the character attribute changing unit.

Another aspect (sixth aspect) of the present invention provides the image reading system as described in the fourth aspect, wherein the dimensions of the area are adjusted according to the calculation result of the amount of overlap between the area of the coded image data reflecting the change of the character attribute and the area of the optical information, the calculation being carried out by the calculating unit.

Another aspect (seventh aspect) of the present invention provides the image reading system as described in the first aspect, wherein a form of the image data output to the recording medium is changed depending on the information held by the IC tag.

Another aspect (eighth aspect) of the present invention provides the image reading system as described in the seventh aspect, wherein the form of the output is changed by changing the character attribute, by adding different image data to the coded image data that are obtained by converting the IC tag information, and by replacing the coded image data with different image data.

Another aspect (ninth aspect) of the present invention provides the image reading system as described in the eighth aspect, wherein the image reading system is connected to a database through a network, the database holding the different image data, and the different image data are acquired from the database.

Another aspect (tenth aspect) of the present invention provides the image reading system as described in the first aspect, further including an area detecting unit for detecting an area that contains an IC tag, or a mark indicating that an IC tag is provided on the manuscript, wherein information contained in the area detected by the detection unit is erased or overwritten by other data.

Another aspect (eleventh aspect) of the present invention provides the image reading system as described in the first aspect, wherein the conversion unit adds history information at least including information indicating that it is copied when converting the IC information into the coded image data.

Another aspect (twelfth aspect) of the present invention provides the image reading system as described in the first through the eleventh aspects, further including a tag position detecting unit for detecting whether an IC tag is provided, and for detecting a position of the IC tag on the recording medium, wherein an image is not written in a predetermined area including the detected position of the IC tag.

Another aspect (thirteenth aspect) of the present invention provides the image reading system as described in the twelfth aspect, wherein a mark indicating the presence of the IC tag is printed, if the tag position detecting unit determines that there is the IC tag on the recording medium.

Effect of the Invention

As described above, according to the present invention, since all or a part of the tag information read from the IC tag provided on the manuscript is converted into the coded image information, a process of converting to bar code information is suitably performed, and a process of embedding a digital watermark in the read image information is suitably performed. In this way, the information held by the IC tag provided on the manuscript is recorded in an output image as the bar code or the digital watermark. Accordingly, the information recorded on the IC tag is maintained in the copied image, and is held as code information. In this way, the tag information can be easily acquired as electronic data, and the efficiency of document management is improved.

BRIEF DESCRIPTION OF THE DRAWINGS

FIG. 7 is a table showing an example of information held by the IC tag according to the embodiment of the present invention;

FIG. 8 is a table showing an example of the information held by the IC tag with history information being added according to the embodiment of the present invention;

DESCRIPTION OF THE PREFERRED EMBODIMENTS

In the following, embodiments of the present invention are described with reference to the accompanying drawings.

Figure 1:
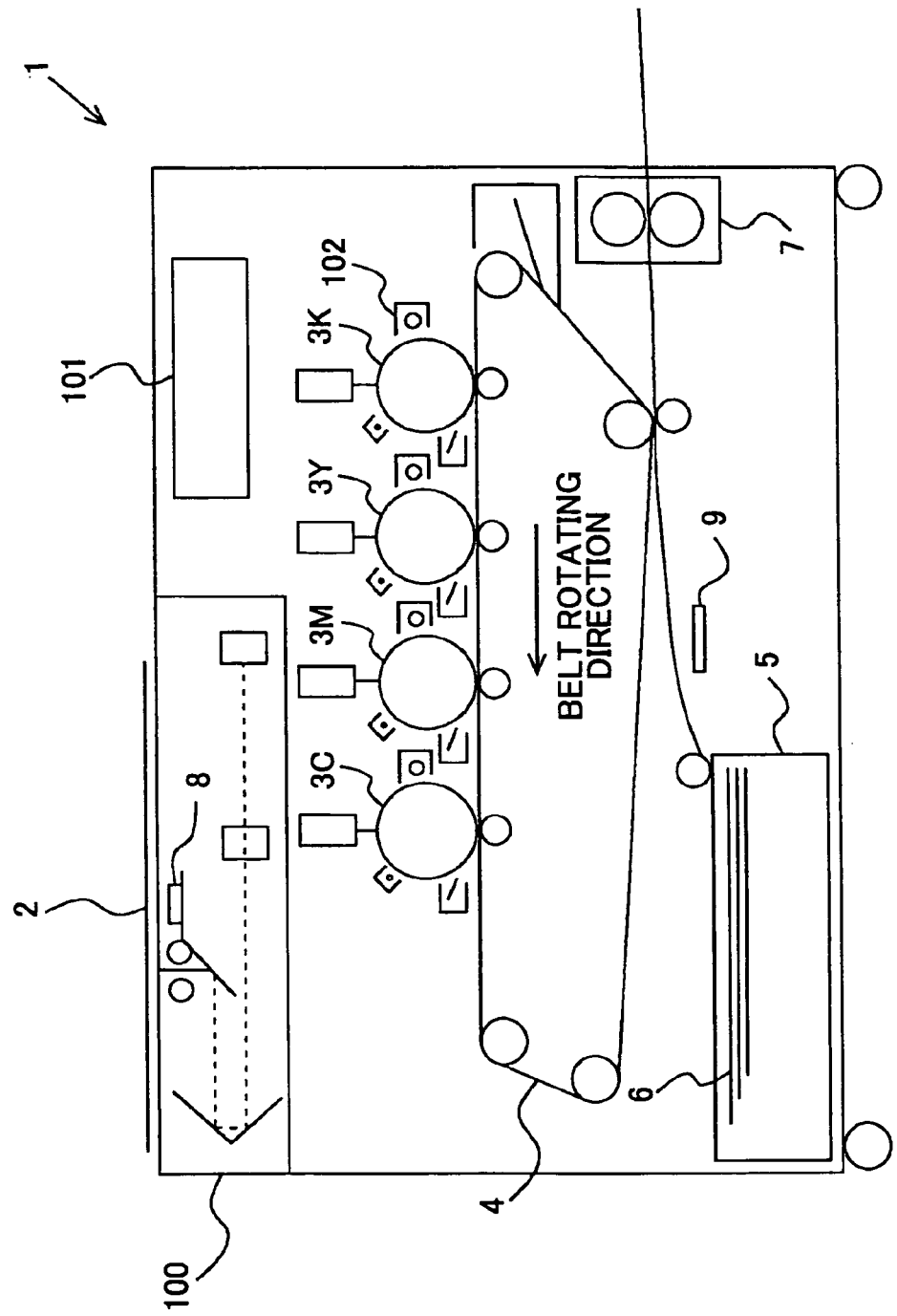
FIG. 1 is a cross-sectional drawing showing the outline configuration of a copying machine according to an embodiment of the present invention.

FIG. 1 is an outline block diagram of a tandem type digital color copying machine 1 (the copying machine 1) according to the embodiment.

The copying machine 1 includes an image reading unit 100 (IIT: Image Input Terminal) for reading an image of a manuscript 2, the image reading unit 100 being arranged at an upper part on a side of the copying machine 1, an image processing unit (IPS) 101 for carrying out predetermined image processing of image data provided by the image reading unit 100, a personal computer that is not illustrated, a telephone line, LAN, etc., and an image outputting unit (IOT: Image Output Terminal) 102 for outputting an image based on the image data processed by the image processing unit 101.

The image outputting unit 102 includes image formation units 3K, 3Y, 3M, and 3C for black (K), yellow (Y), magenta (M), and cyan (C) colors, respectively, the image formation units being horizontally arranged at a fixed interval.

Further, a middle imprint belt 4 is provided under the four image formation units 3K, 3Y, 3M, and 3C, for imprinting toner images in the corresponding colors, wherein the toner images imprinted by the image formation units are piled up (superposed) one by one. The middle imprint belt 4 rotates in a direction of an arrow shown in FIG. 1. The superposed toner image in the four colors imprinted on the middle imprint belt 4 is imprinted on a recording medium 6, which is paper fed from a feed tray 5, and the like. Then, the superposed toner image is fixed to the recording medium 6 by a fixing unit 7, and the recording medium 6 is discharged to the outside.

Further, the image reading unit 100 includes an IC tag reader 8 for reading information held by an IC tag that is provided on the manuscript, in addition to a unit for optically reading the manuscript. Further, an IC tag writer 9 for recording information on the IC tag is provided along a path from the feed tray 5 to the imprint positions where the toner images are imprinted onto the recording medium 6.

In the case that the communication range of the IC tag for reading and writing is short, and in the case that the installation position of the IC tag is to be determined, two or more antennas aligned in the direction of horizontal scanning may be provided to the IC tag reader 8 and the IC tag writer 9. In this way, even if the IC tag having a short communication range is arranged at any place on the recording medium 6, reading and writing are possible, and determining the position of the IC tag is possible by determining which antenna detects a signal from the IC tag.

Figure 2:
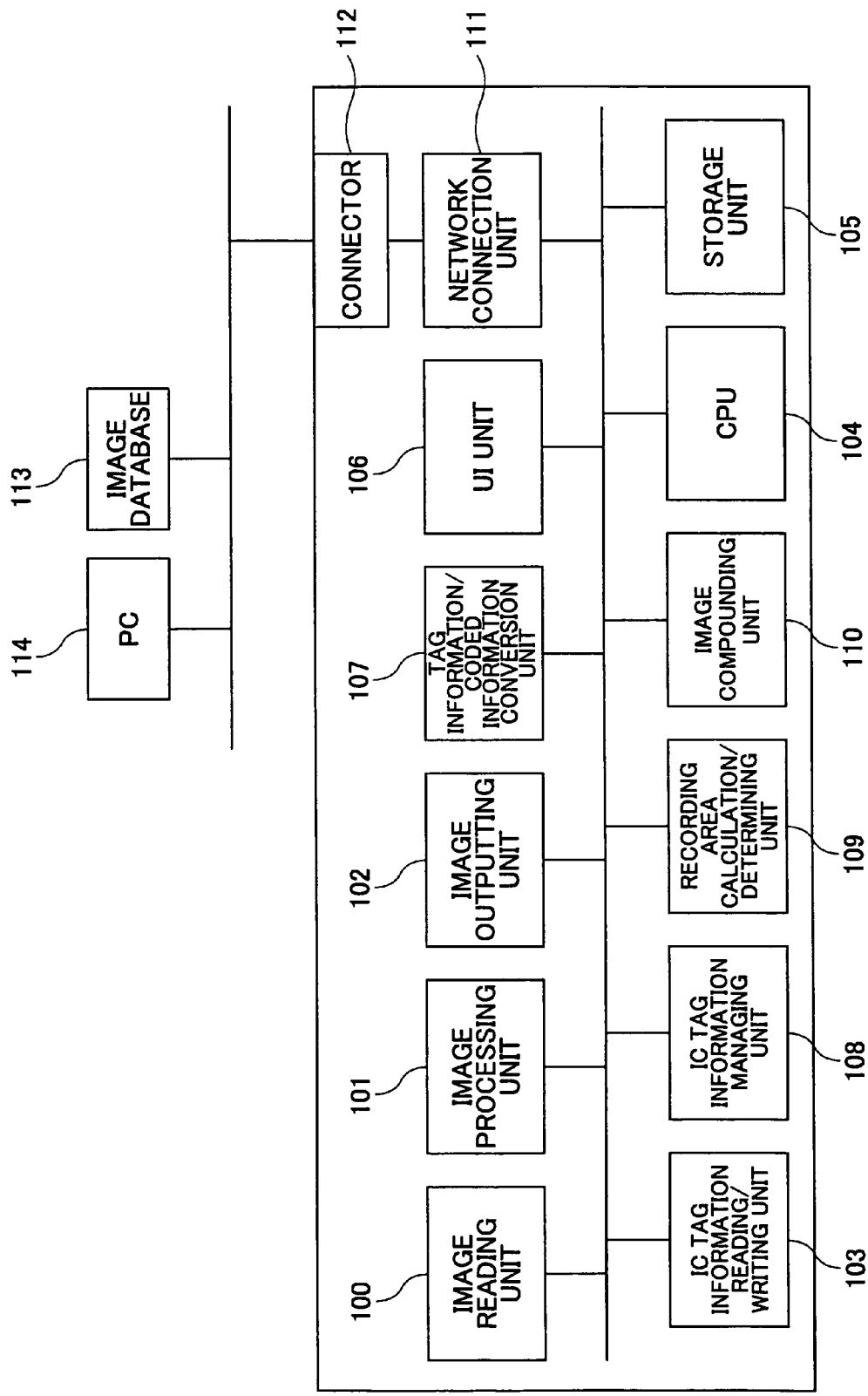
FIG. 2 is a block diagram of the copying machine according to the embodiment of the present invention.

FIG. 2 is a block diagram showing the configuration of the copying machine 1.

The copying machine 1 includes the image reading unit 100, the image processing unit 101, the image outputting unit 102, an IC tag information reading/writing unit 103, a CPU 104, a storage unit 105, a UI (user interface) unit 106, a tag information/coded information conversion unit 107, an IC tag information managing unit 108, a recording area calculation/determining unit 109, an image compounding unit 110, a network connection unit 111, a connector 112, an image database (DB) 113, and a PC 114.

The image reading unit 100 reads optical information of the manuscript 2 (manuscript information) placed on a manuscript stand, and the image processing unit 101 carries out a gradation process and the like on the read image (manuscript information). The image output unit 102 prints one of or both the manuscript information and the IC tag information. The IC tag information reading/writing unit 103 includes the IC tag reader 8 for reading the tag information held by the IC tag provided on the manuscript, and the IC tag writer 9 for writing information into the IC tag provided on the recording medium.

The CPU 104 controls the overall operations of the copying machine 1, and the storage unit 105 holds information required for the operations. The UI unit (user interface unit) 106 includes a display, a keyboard/touch panel, and so on. The tag information/coded information conversion unit 107 converts the read IC tag information into coded information that can be output as an image, and performs conversion in the reverse direction.

The IC tag information managing unit 108 controls an output format, an output position, and conditions for outputting the read IC tag information. When compounding and outputting the IC tag information and the manuscript information, the recording area calculation/determining unit 109 computes the areas of the IC tag information and the manuscript information, computes an amount of overlap between the areas of the IC tag information and the manuscript information to be output, and compares the overlap amount with a predetermined amount.

The image compounding unit 110 compounds the manuscript information and the IC tag information. The network connection unit 111 controls connections to an external network. The connector 112 is for physically connecting the external network. The image database 113, the PC 114, etc. are connected to the external network.

Next, the manuscript having the IC tag is described with reference to FIGS. 3 through 6.

Figure 3:
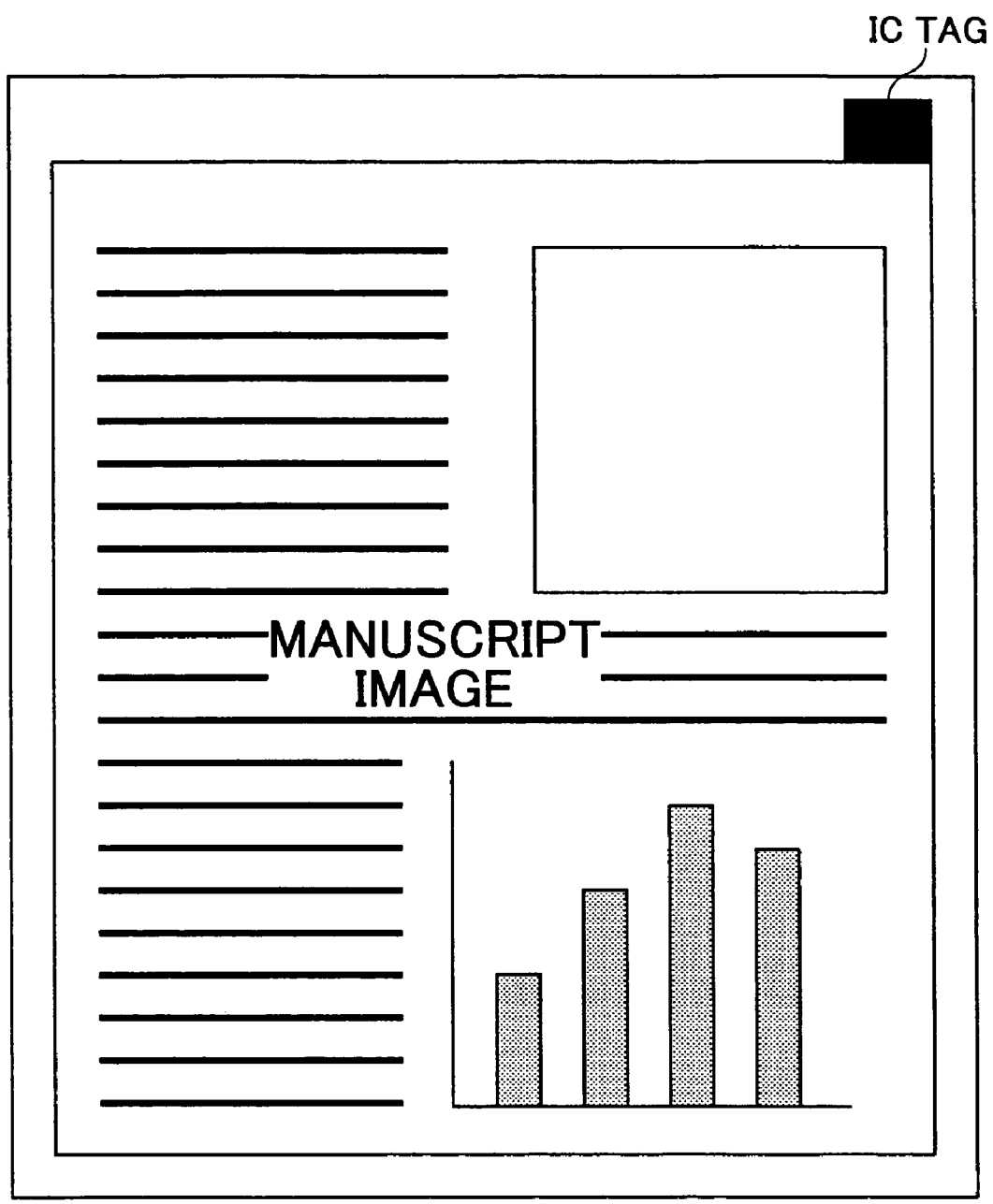
FIG. 3 shows an example of a manuscript on which an IC tag is provided according to the embodiment of the present invention.
Figure 4:
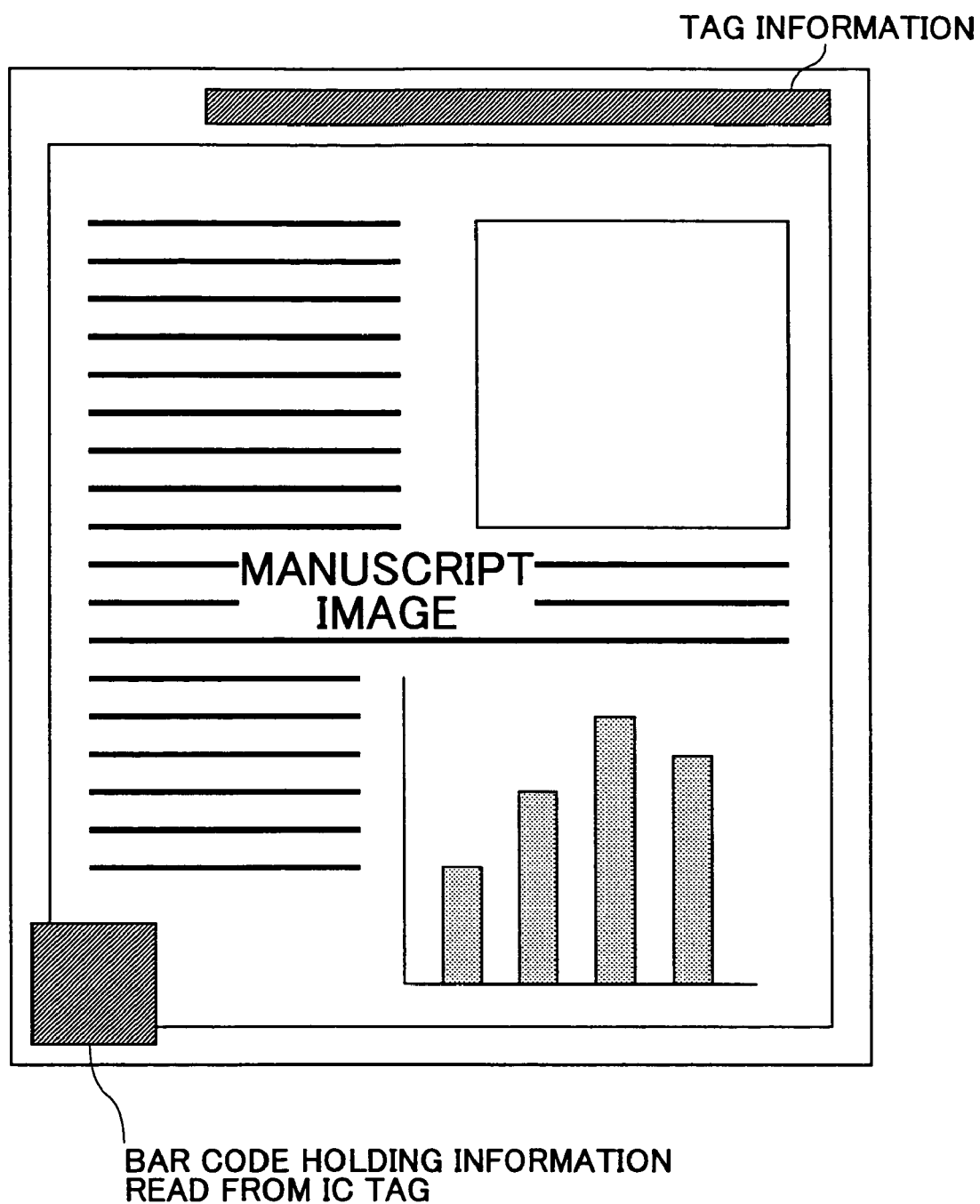
FIG. 4 shows an example of the manuscript on which tag information is provided according to the embodiment of the present invention.

Usually, the IC tag is provided at an upper right section of the manuscript as shown in FIG. 3. When the manuscript is copied, the information held by the IC tag is compounded into a 2-dimensional bar code and printed in an upper space as shown in FIG. 4.

In this way, even when the manuscript with the IC tag is copied onto the recording medium that does not have an IC tag, the IC tag information of the manuscript is recorded as the code (bar code) information on the recording medium. Since the IC tag information (for example, author, creation date, title, etc.) of the manuscript is maintained as the code information on the copy, the copy can be electronically processed with ease compared with the case where the information is recorded as text on the copy, and documentation management can be efficiently performed.

Figure 5:
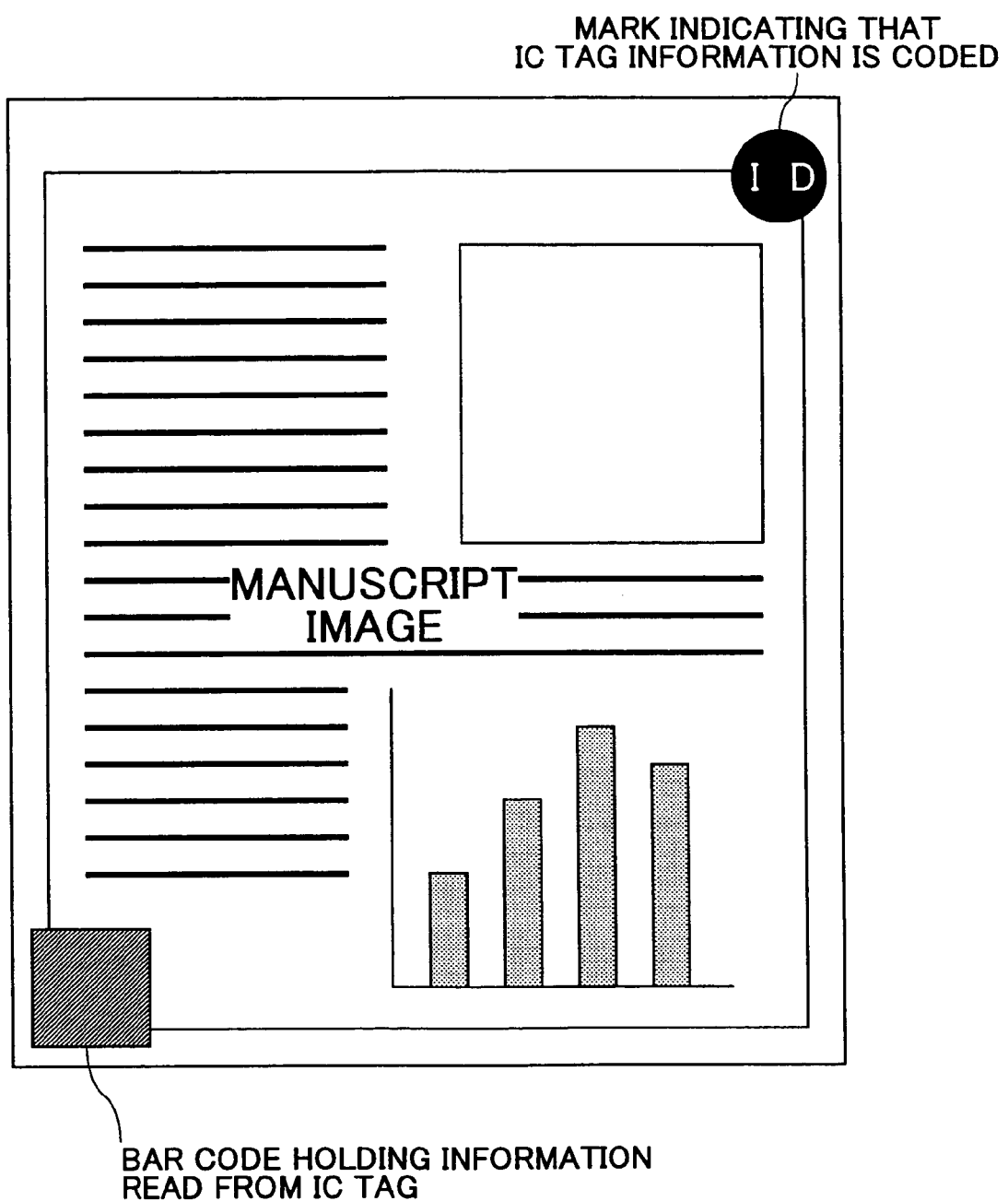
FIG. 5 shows an example of the manuscript on which a mark is provided, the mark indicating that IC tag information is coded, according to the embodiment of the present invention.
Figure 6:
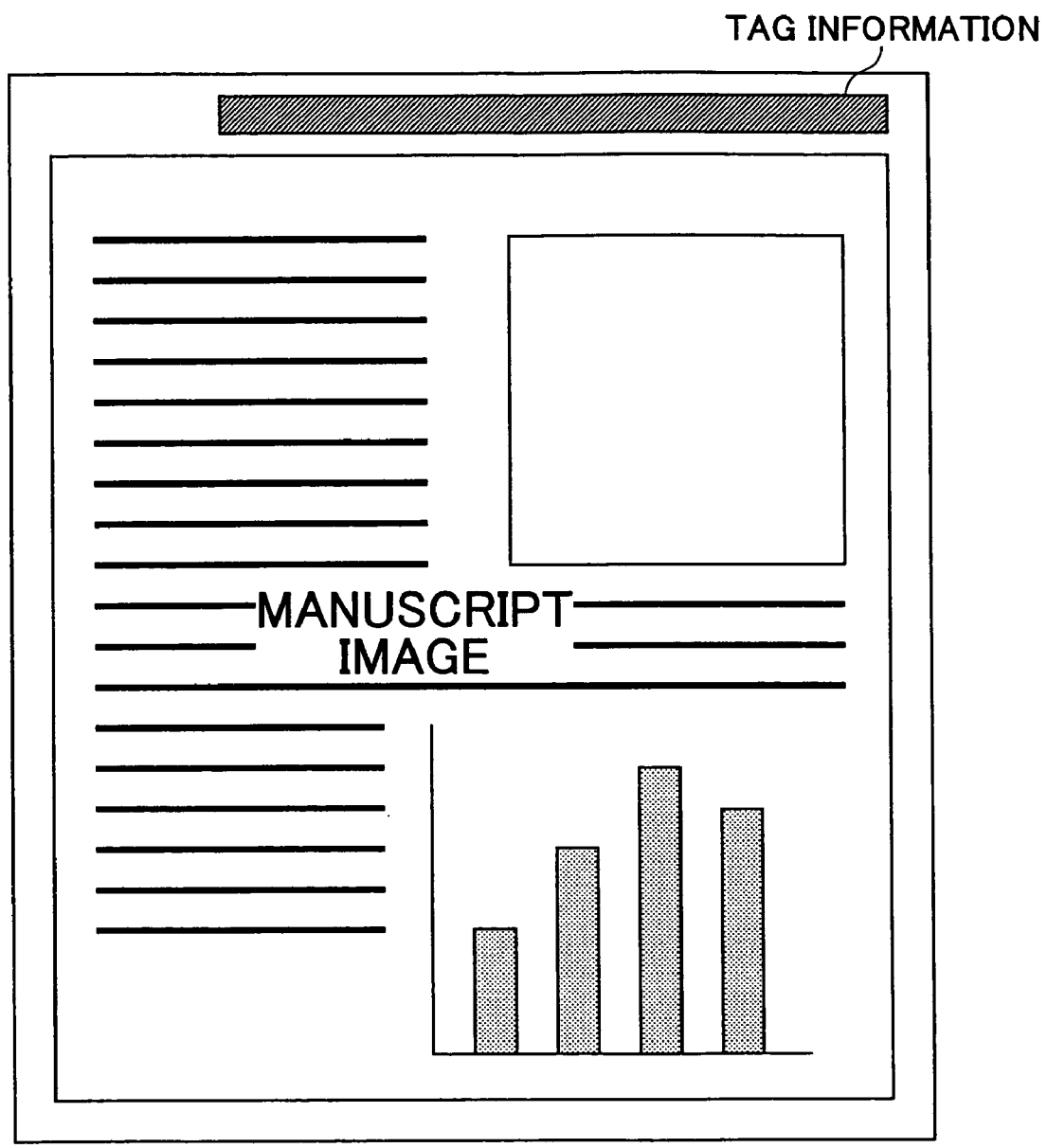
FIG. 6 shows an example of the manuscript on which the tag information is provided according to the embodiment of the present invention.

Further, when outputting a mark indicating that the IC tag information is coded and compounded, a mark indicating that the tag information is recorded in a form such as a bar code may be compounded by an image compounding process as shown in FIG. 5. An image to be compounded is held in the storage unit 105, and the image compounding unit 110 reads the image and compounds the image. In this way, copied documents with tag information and without tag information can be easily differentiated, and the efficiency of documentation management is raised. Further, only the IC tag information may be compounded onto the manuscript as shown in FIG. 6.

Next, an example of the information held by the IC tag is described.

As shown in FIG. 7, the information held by the IC tag includes documentation management information such as a classification number, a creation date, an author, and a modification date of the manuscript; affiliation of the author; an application used in authoring the manuscript; an output machine that outputs the manuscript; a secrecy level of the manuscript; and a URL.

FIG. 8 shows the case wherein a copying history is added to the documentation management information shown in FIG. 7. The copying history is for recording the copying of the manuscript. Although the contents of the history information are not limited, the contents suitably include a copied time and an ID of the copying machine for documentation management.

Figure 9:
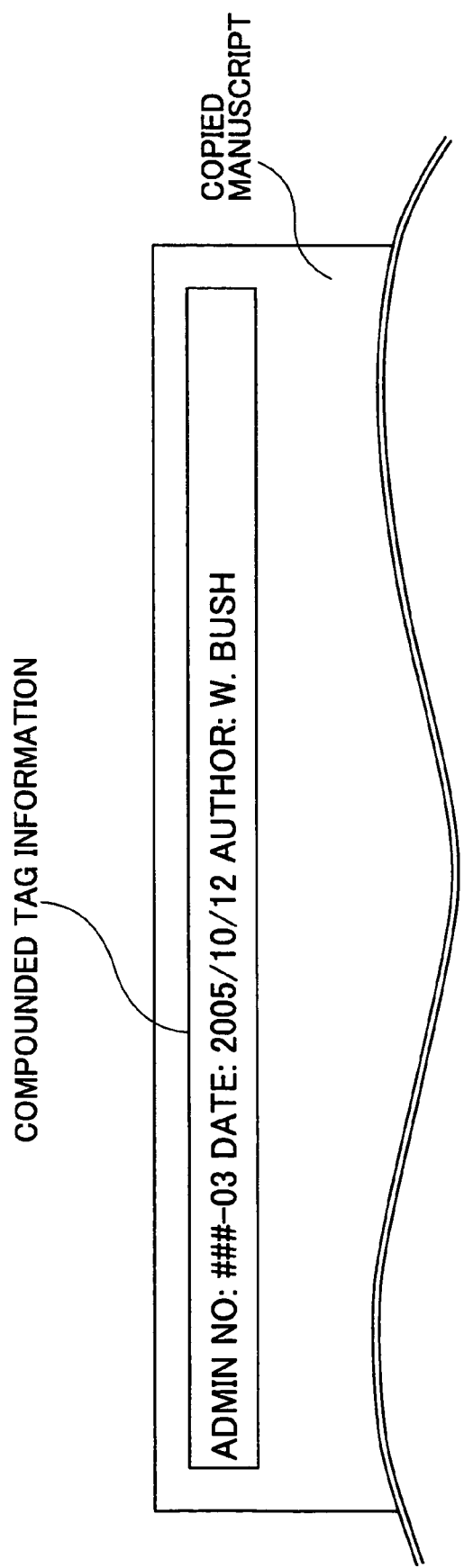
FIG. 9 shows an example of the IC tag information presented as text, and compounded with an image of the manuscript according to the embodiment of the present invention.
Figure 10:
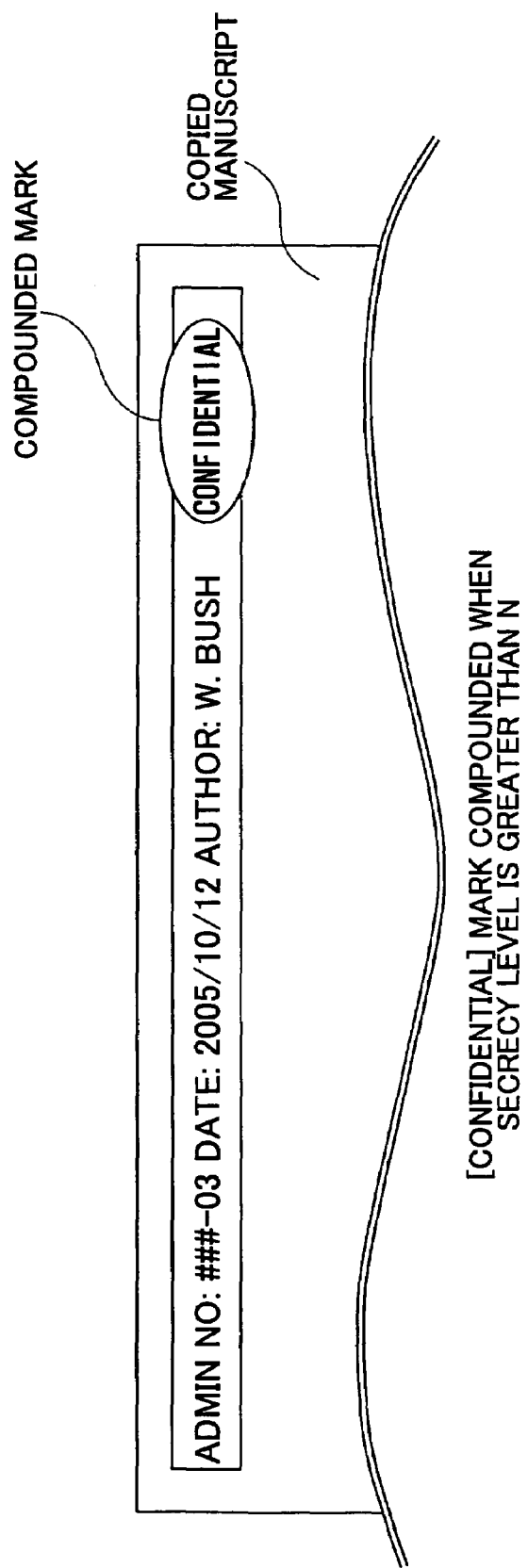
FIG. 10 shows an example wherein an image is compounded with the tag information according to the embodiment of the present invention.

FIG. 9 shows an example wherein the IC tag information as text is compounded with the manuscript image. The text data compounded into the copy manuscript with the manuscript image include the classification number, the creation date, the author and so on as shown in FIGS. 7 and 8. When the secrecy level is recorded in the IC tag information as shown in FIG. 10, a mark indicating "CONFIDENTIAL" may be compounded with the manuscript image, and output.

Figure 11:
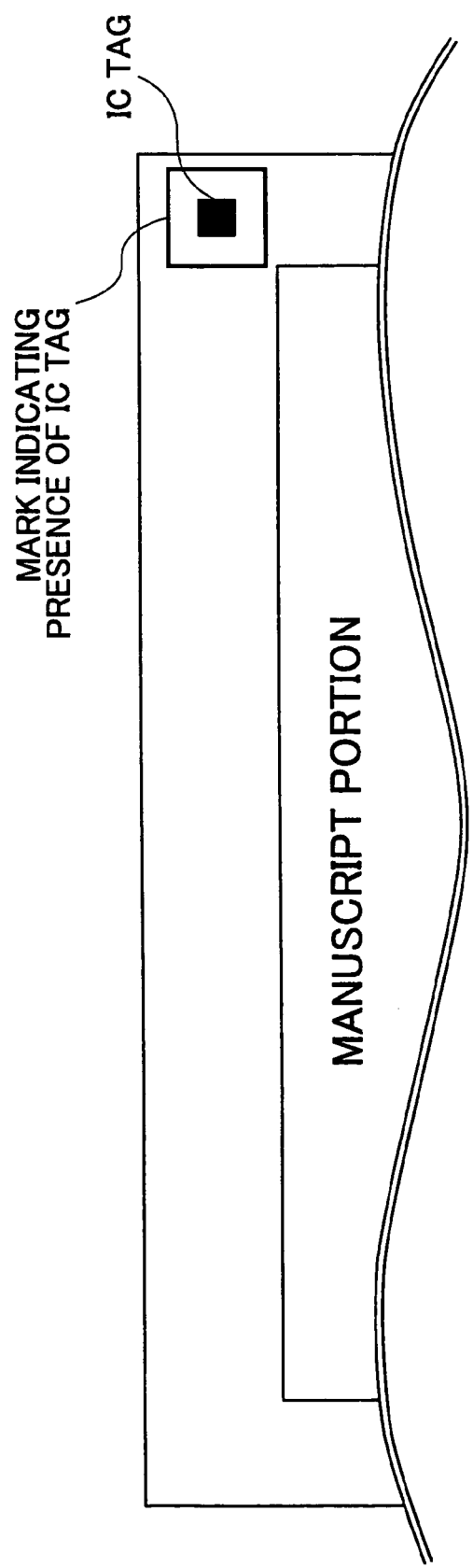
FIG. 11 shows an example of the manuscript wherein a mark indicating the presence of the IC tag is provided according to the embodiment of the present invention.

Further, as shown in FIG. 11, when a mark that indicates the presence of a tag is provided around the IC tag, and if erasing of the manuscript including the mark is desired, the manuscript is subjected to pattern matching and the like; when the mark is detected, data including the mark can be replaced/erased.

Figure 12:
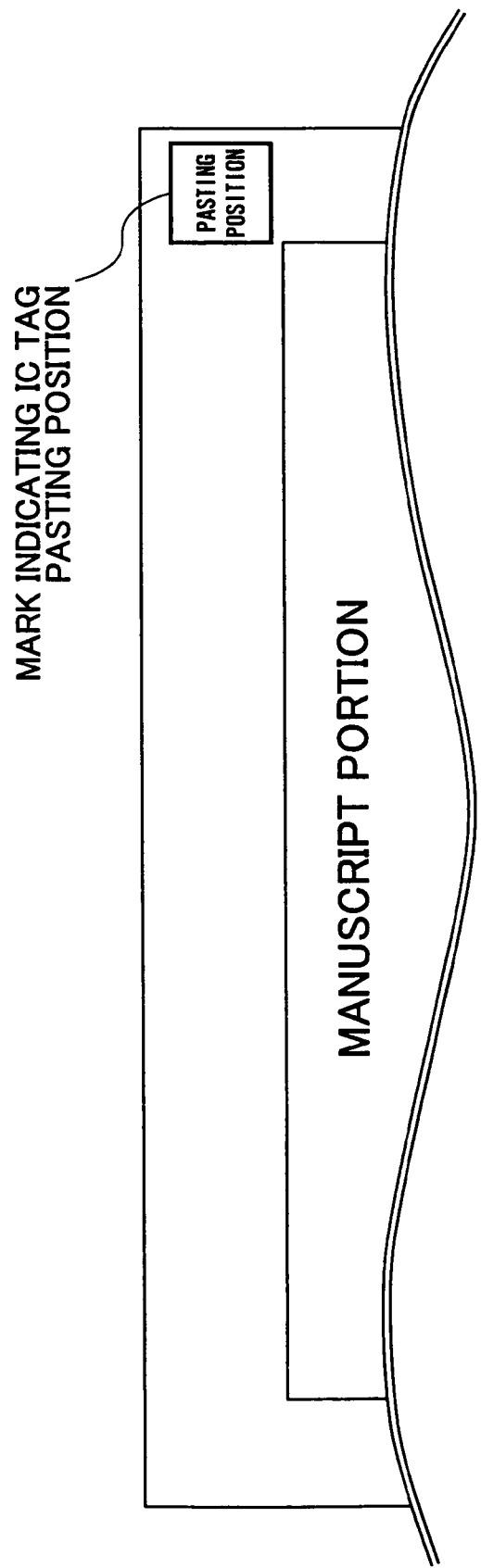
FIG. 12 shows an example of the manuscript wherein a mark indicating a pasting position of the IC tag is provided according to the embodiment of the present invention.
Figure 13:
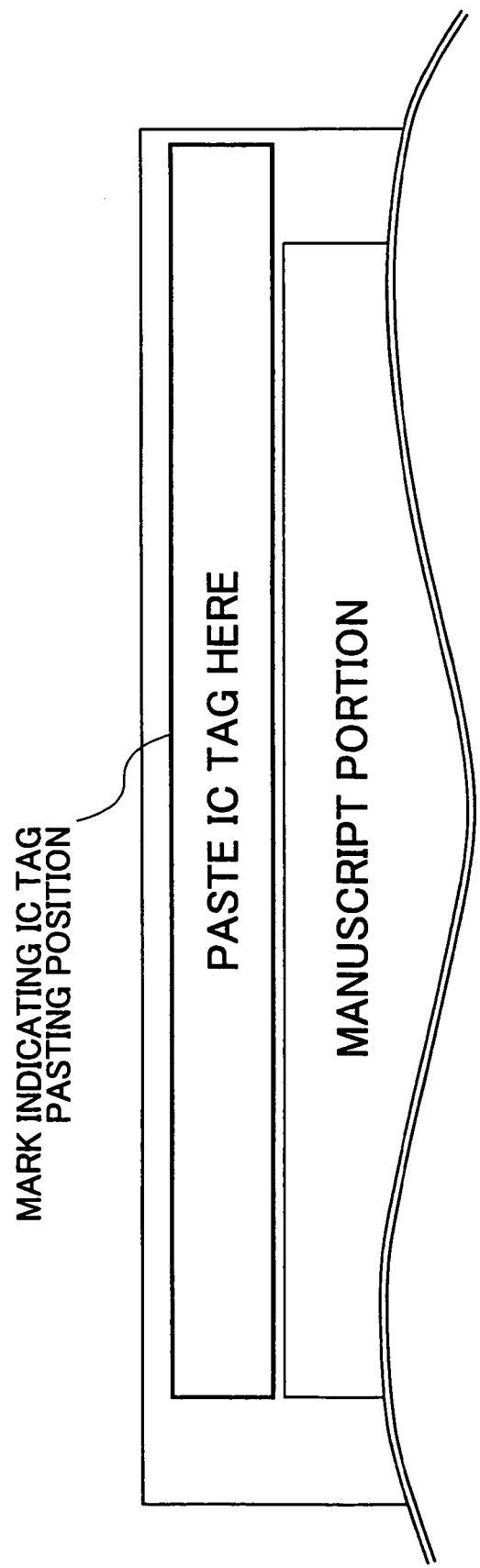
FIG. 13 shows another example of the manuscript wherein a mark indicating the pasting position of the IC tag is provided according to the embodiment of the present invention.

FIGS. 12 and 13 shows examples wherein a mark that shows a position where an IC tag is to be pasted is compounded and output to the recording medium. An input image is prevented from being written in the position of the IC tag; in this way, interference between the input image and the IC tag is avoided.

Figure 14:
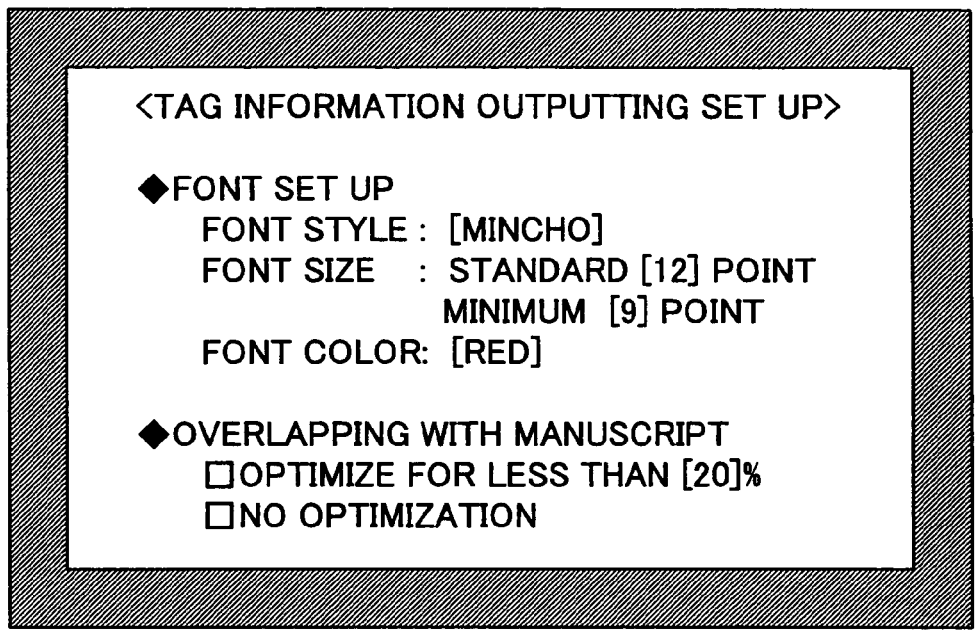
FIG. 14 shows an output setting screen of the tag information according to the embodiment of the present invention.

Next, FIG. 14 shows an example of a screen display for setting up output conditions.

Figure 15:
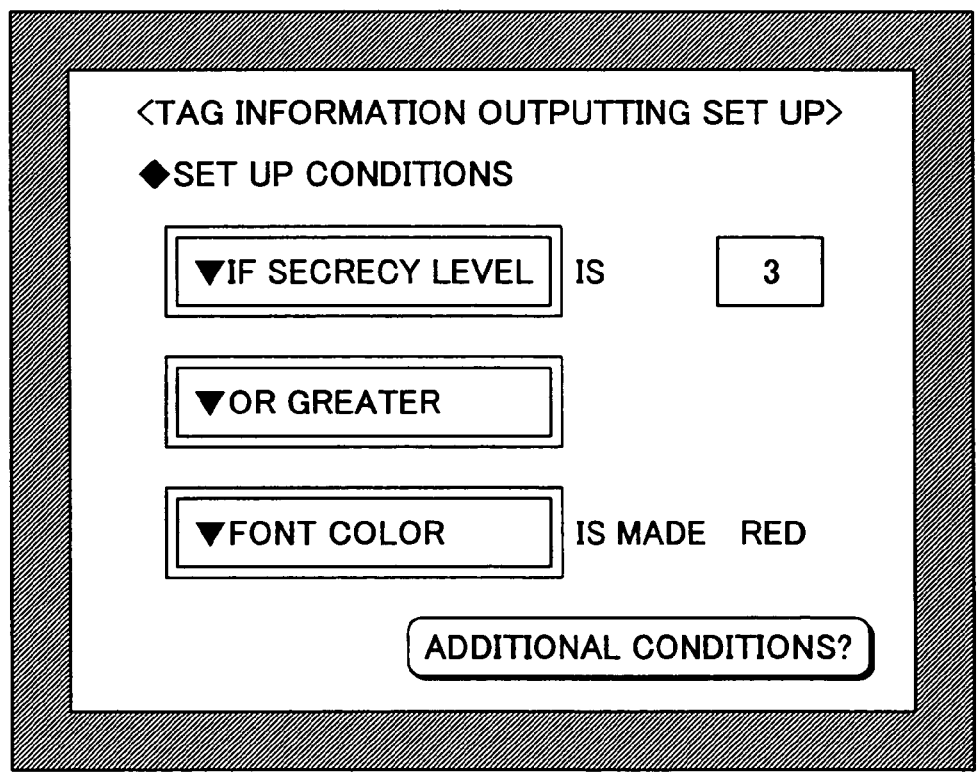
FIG. 15 shows an output setting screen of the tag information according to the embodiment of the present invention.

A user can set up the output conditions of the IC tag information referring to the screen as shown in FIG. 14. For example, a font can be selected, and a condition concerning the overlap with the manuscript can be set up. Further, as shown in FIG. 15, the output conditions of the IC tag information can be set up, e.g., the color of the font can be changed according to secrecy levels.

Figure 16:
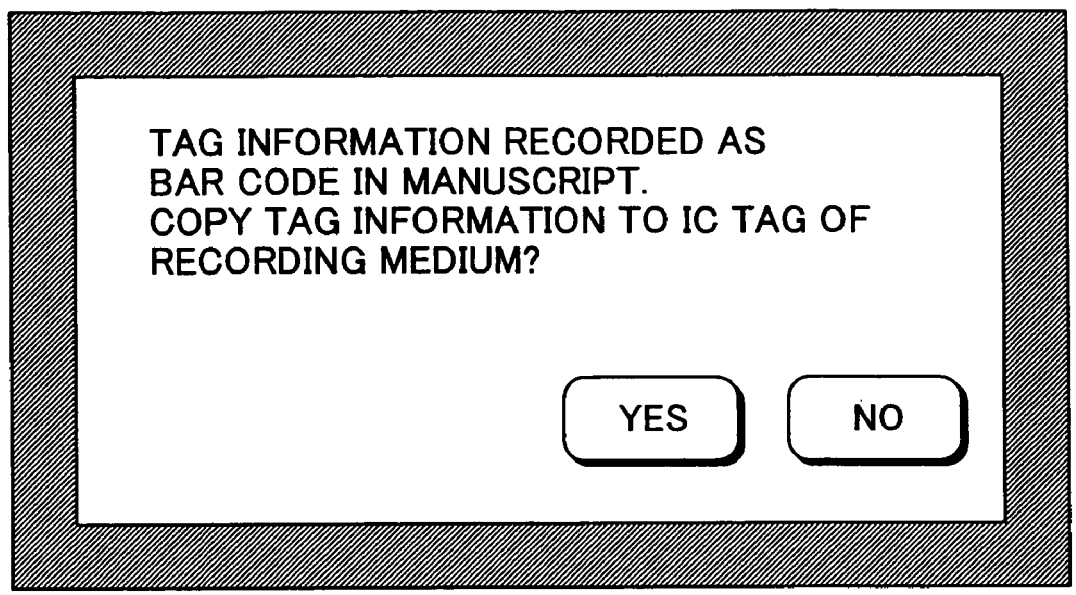
FIG. 16 shows an example of a display of a message prompting a user to select whether to copy according to the embodiment of the present invention.
Figure 17:
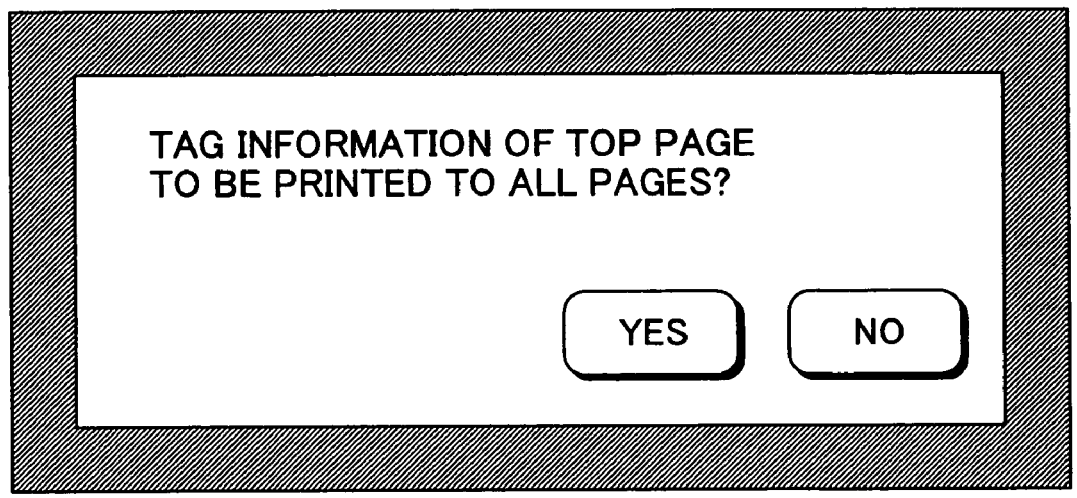
FIG. 17 shows an example of a display of a message prompting the user to select whether to copy according to the embodiment of the present invention.

Further, FIGS. 16 and 17 show examples of screen displays provided when IC tag information is detected on the manuscript. The user is notified of the fact. Then, the user directs whether the IC tag information is to be written into the IC tag on the recording medium, and whether the IC tag information is to be printed on all the pages that follow the top page that has the IC tag information.

Figure 18:
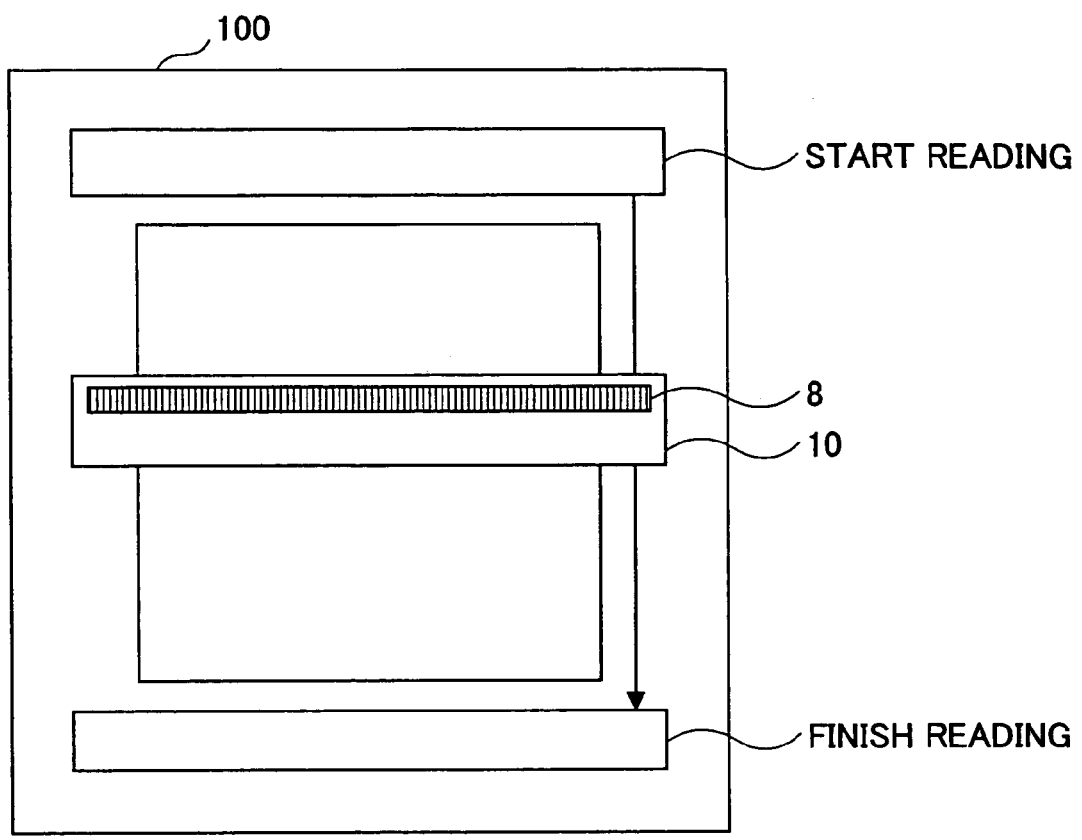
FIG. 18 is a plan view of a scanner head in which an IC tag reader is provided according to the embodiment of the present invention.
Figure 19:
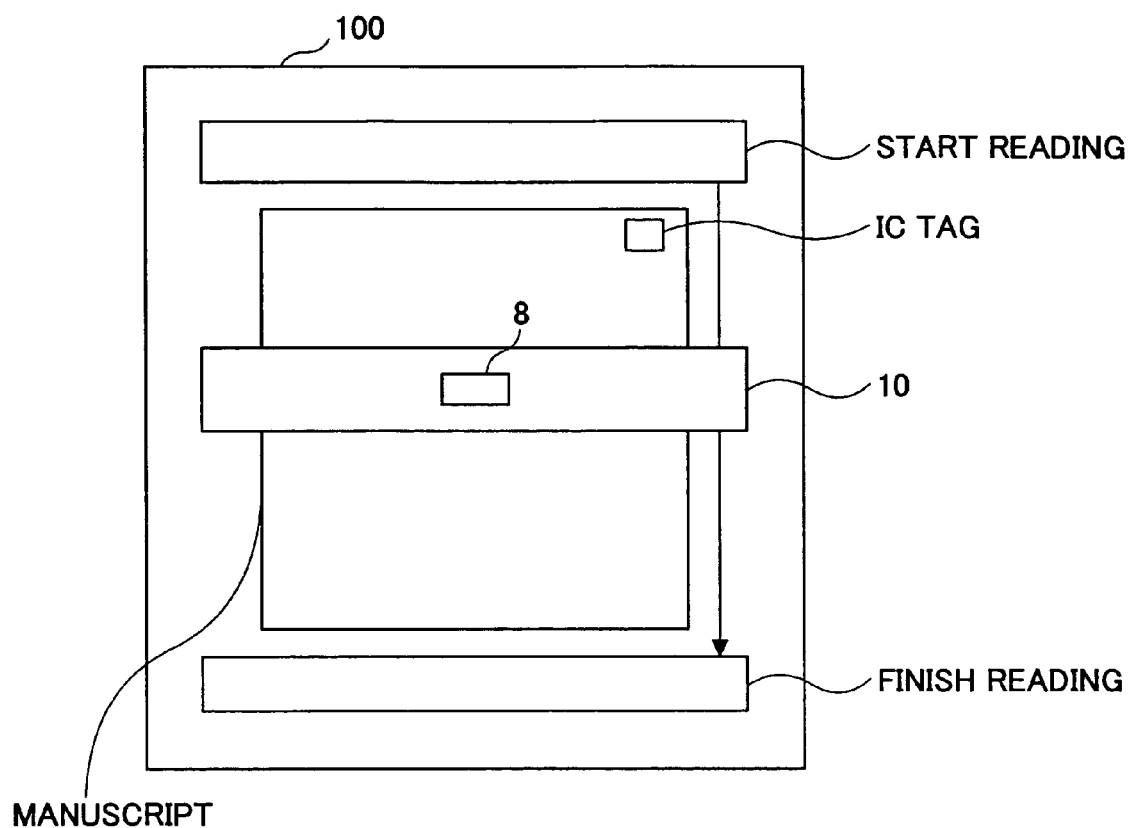
FIG. 19 is a plan view of the scanner head in which the IC tag reader is provided according to the embodiment of the present invention.

Next, with reference to FIGS. 18 and 19, the configuration of a scanner head is explained, wherein the IC tag reader 8 is installed.

As shown in FIG. 18, two or more IC tag readers 8 are arranged on the surface of the scanner head in directions approximately perpendicular to the moving direction (the direction of an arrow) of the scanner head, the surface countering the recording medium, and constituting an antenna array.

Further, as shown in FIG. 19, when the communication range of the IC tag is long enough, and when determining the installation position of the IC tag is not required, the IC tag reader 8 is placed at any point within the communication range.

Figure 20:
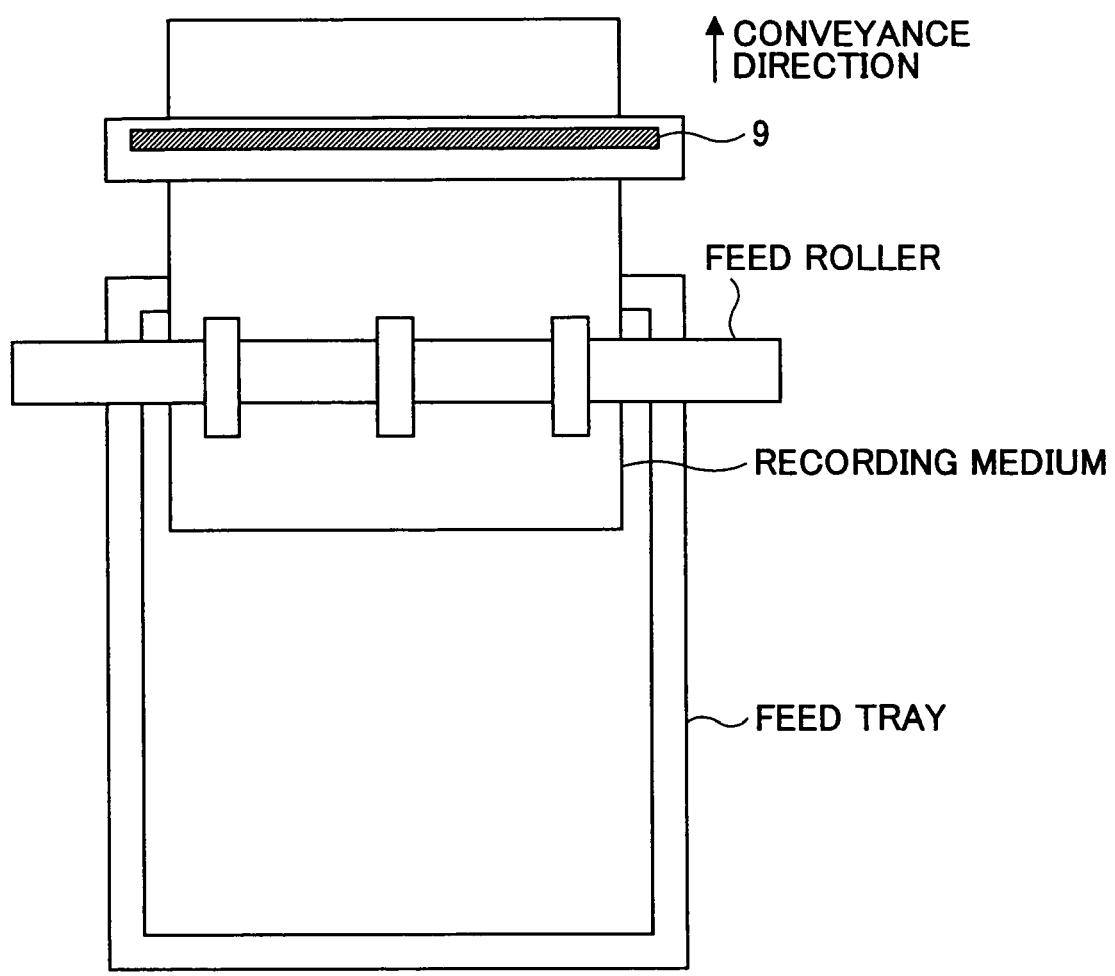
FIG. 20 is a plan view of an example of an IC tag writer according to the embodiment of the present invention.
Figure 21:
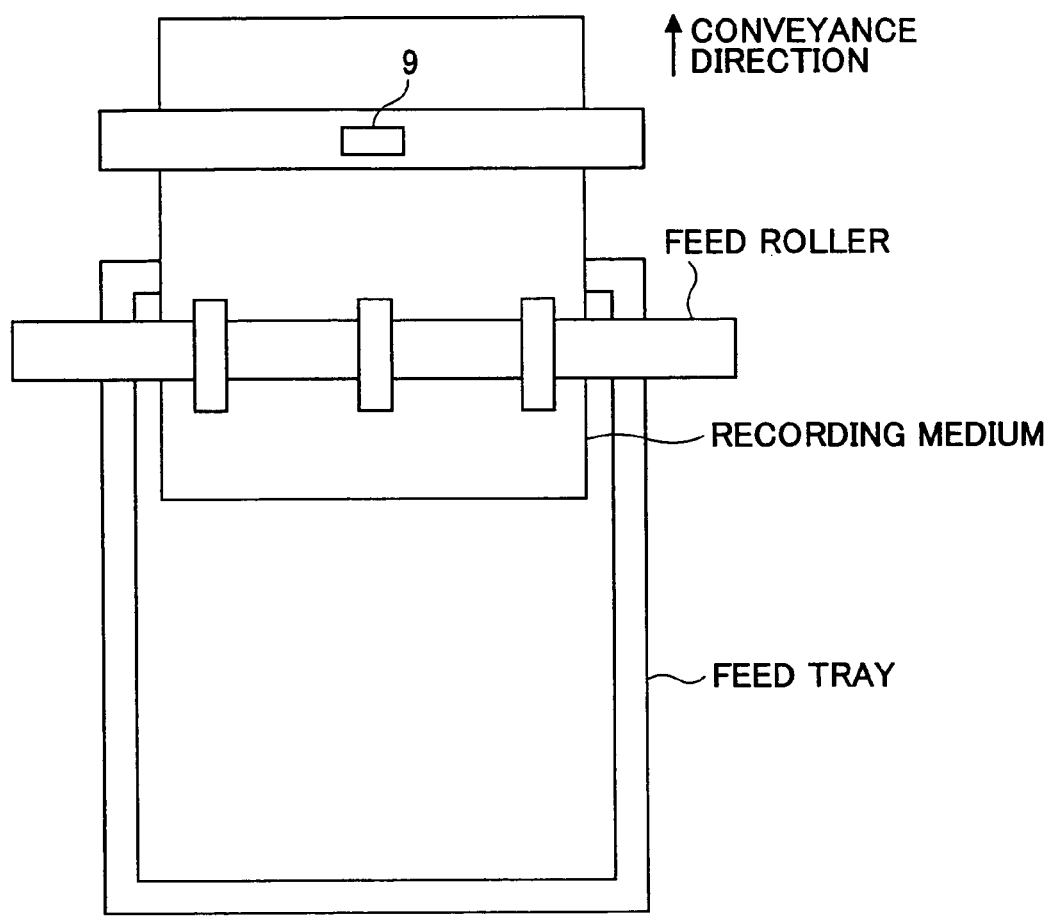
FIG. 21 is a plan view of an example of the IC tag writer according to the embodiment of the present invention.

Next, with reference to FIGS. 20 and 21, an example of installation of the IC tag writer is described.

Two or more IC tag writers 9 are arranged in directions approximately perpendicular to the conveyance direction (the direction of an arrow) of the recording medium, and constitute an antenna array. Similar to the case of the tag reader(s) 8, when the communication range of the tag writer 9 is sufficiently long, and when determination of the installation position of the IC tag is not required, the tag writer 9 may be placed at any point along the route between the feed tray and the discharge position within the communication range with one antenna as shown in FIG. 21.

Next, with reference to FIGS. 22 through 32, operations according to the embodiment of the present invention are described.

Figure 22:
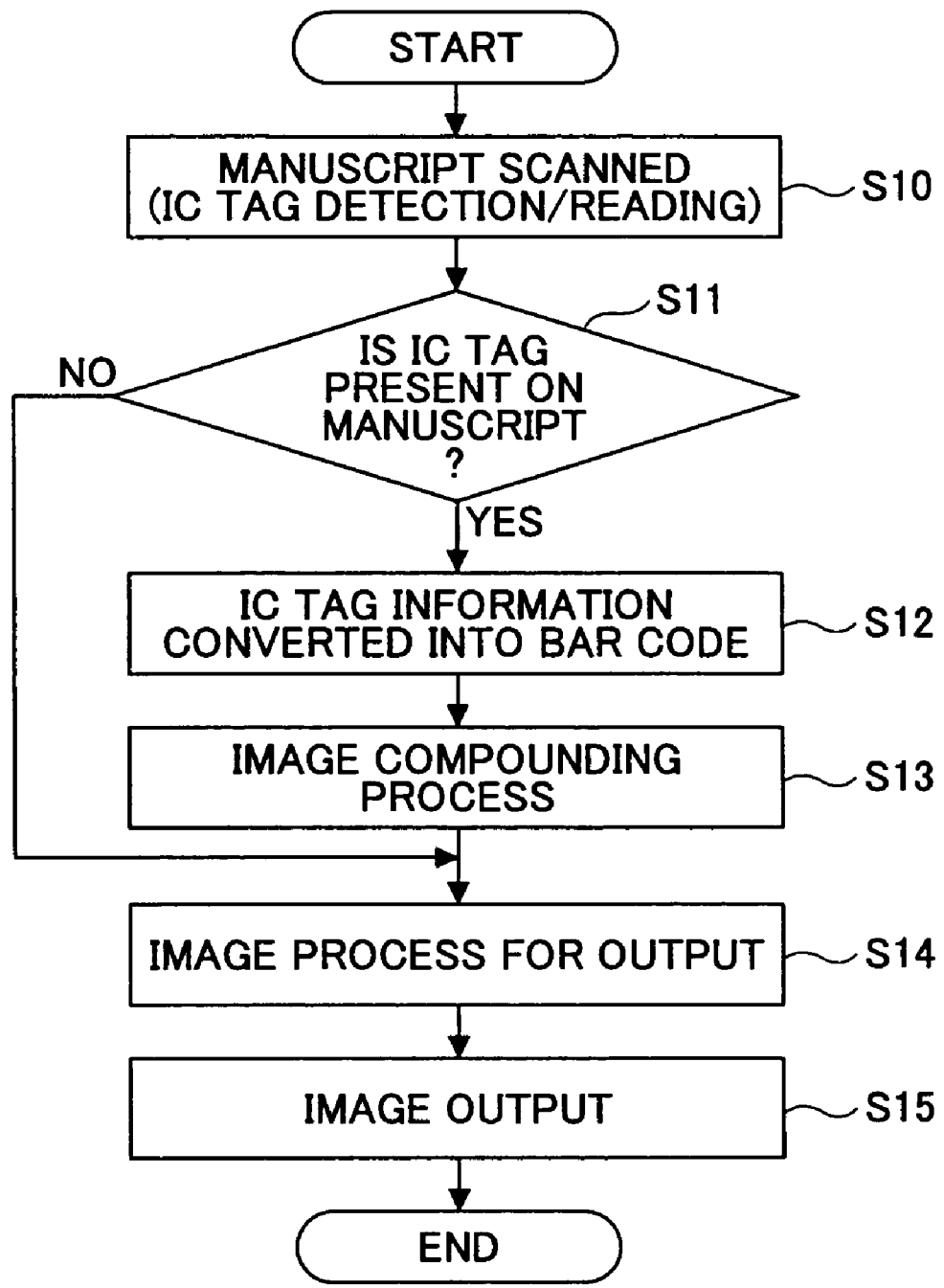
FIG. 22 is a flowchart of operations with the IC tag according to the embodiment of the present invention.

FIG. 22 is a flowchart of a process of outputting the IC tag information to the recording medium.

First, the manuscript is scanned (Step S10). Specifically, the image reading unit 100 scans the manuscript in response to directions to start reading issued by the user. Next, whether an IC tag is provided on the manuscript is determined (Step S11). Specifically, the IC tag information reading/writing unit 103 determines whether the IC tag is provided on the manuscript.

When it is determined that the IC tag is provided on the manuscript (Step S11), information held by the IC tag is read, and is converted into code information like a bar code that can be output as an image (Step S12), and an image compounding process is performed (Step S13). Here, the compounding process is for compounding the manuscript data read at Step S10 and the IC tag information converted into the bar code at Step S12 for outputting to the same recording medium.

Next, the compounded image is processed for outputting (Step S14). Specifically, the read manuscript data are processed as usually performed by a common copying machine; the IC tag information is embedded into the image by digital watermark rather than converting into the bar code, for example. Then, the compounded image data are printed to the recording medium (Step S15).

Further, when it is determined at Step S11 that there is no IC tag on the manuscript (NO at Step S11), a usual copying process performed by the common copying machine is performed at Step S14 and onward.

Various techniques are available for practicing the digital watermark technology used as a method for embedding the IC tag information into the image. As for a method of embedding in a still image, if an object is a binary image, a concentration pattern method, a dithering method, and an error spreading method can be used; and if it is a shade (gray-scale) image, a pixel substitution method, a pixel space method, a frequency domain method, etc., can be used. As for a color image, methods such as a color concentration pattern method are proposed.

Figure 23:
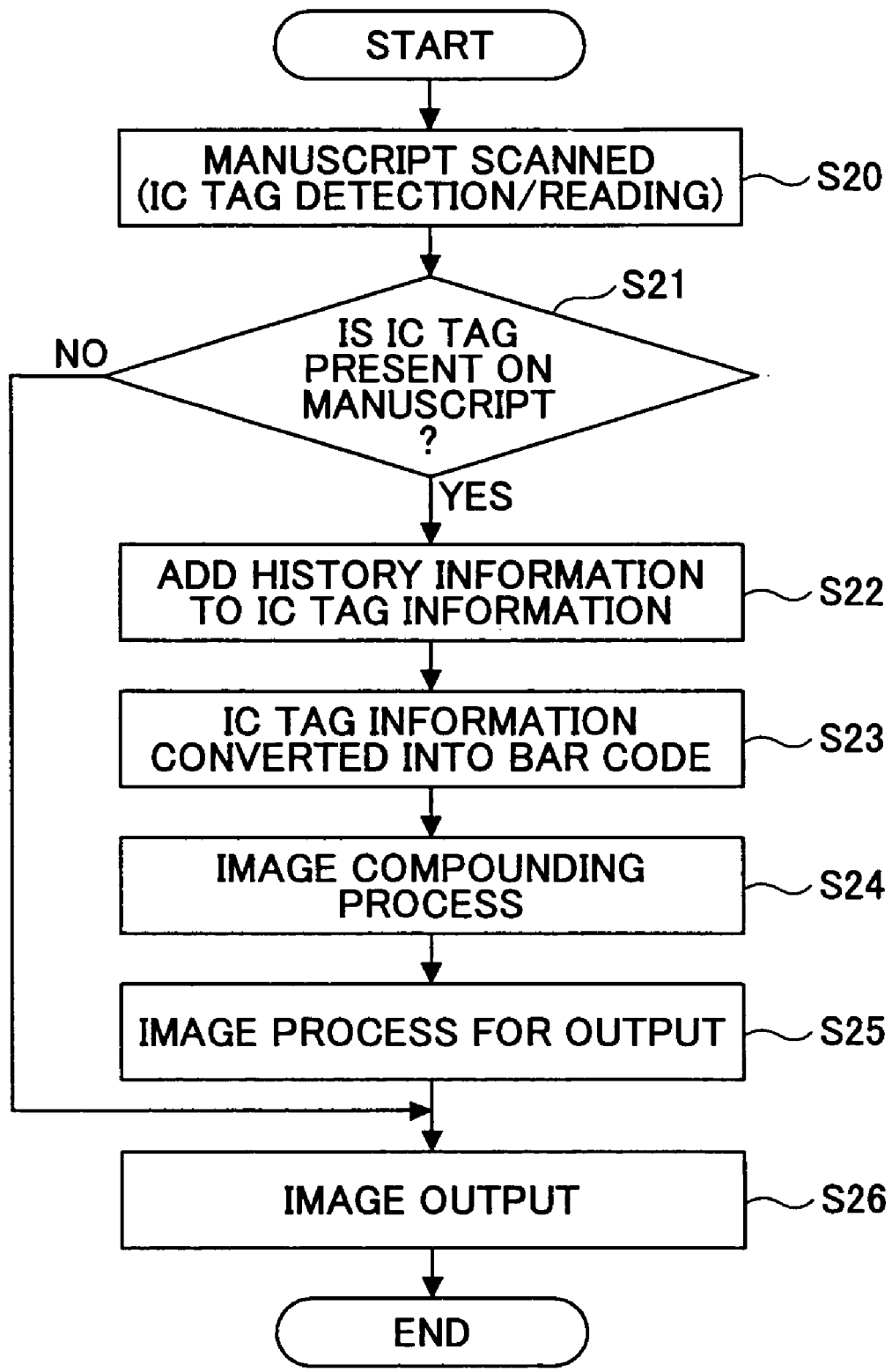
FIG. 23 is a flowchart of operations with the IC tag according to the embodiment of the present invention.

Next, a process of adding the history information to the IC tag information is described with reference to FIG. 23. First, the manuscript is scanned (Step S20). Specifically, the image reading unit 100 scans the manuscript in response to directions to start reading issued by the user. Next, whether an IC tag is provided on the manuscript is determined (Step S21). Specifically, the IC tag information reading/writing unit 103 detects whether an IC tag is provided on the manuscript when reading the manuscript. When it is determined that an IC tag is provided on the manuscript (YES at Step S21), the history information is added to the IC tag information (Step S22). Here, the history information includes items such as the copied date/time, and ID of the copying machine (refer to FIG. 8).

Next, the IC tag information read is converted into the code information like a bar code that can be output as an image (Step S23), and a compounding process is performed for compounding the manuscript information read at Step S20 and the tag information converted into the bar code at Step 23 for outputting to the same recording medium (Step S24).

Next, the compounded image is processed as performed by a common copying machine, and the IC tag information is embedded in the image (Step S25). Then, the compounded image is printed on the recording medium (Step S26).

Figure 24:
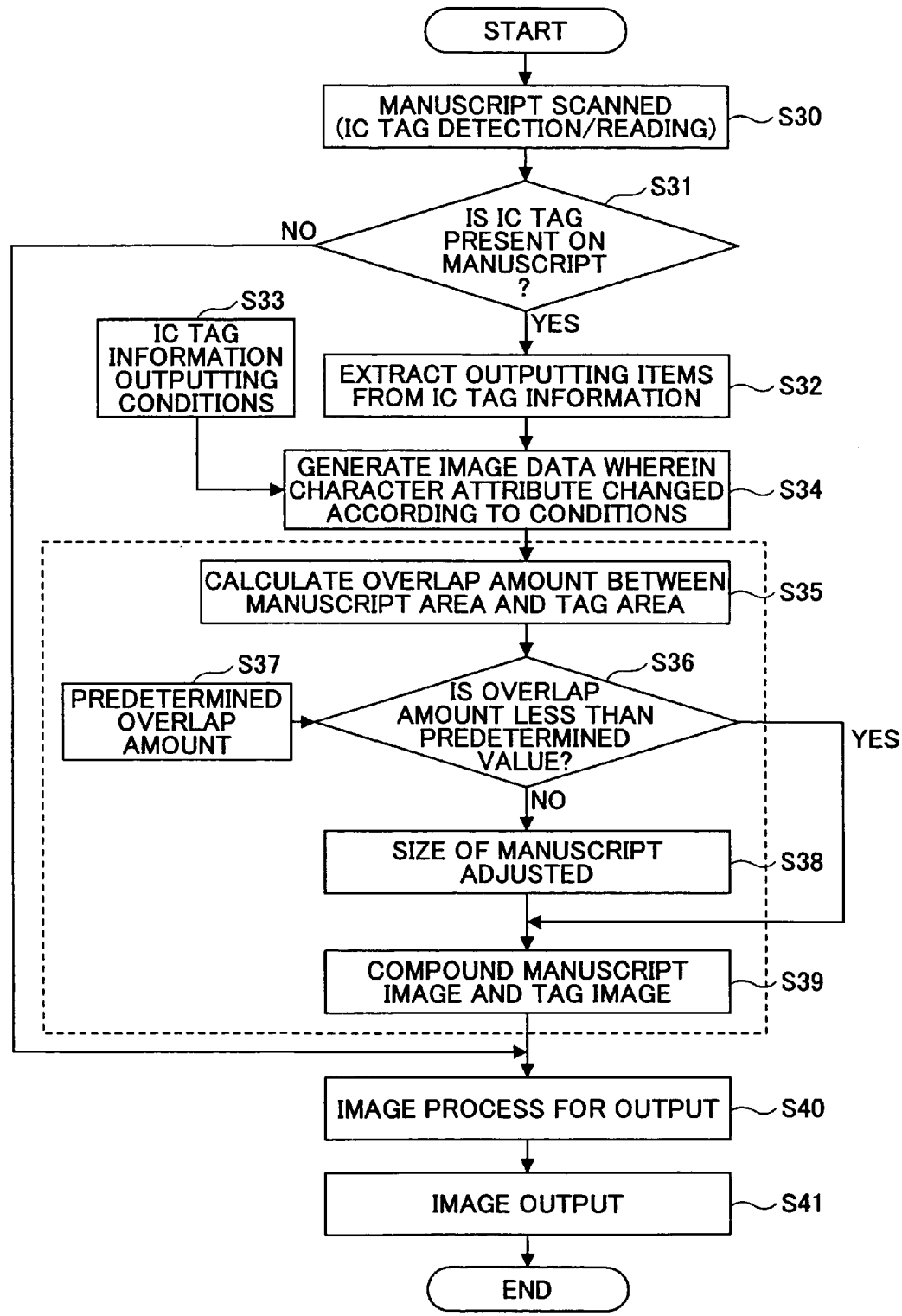
FIG. 24 is a flowchart of operations with the IC tag according to the embodiment of the present invention.

Next, with reference to FIG. 24, a process of comparing the area of the manuscript and the area of the IC tag information is described.

First, the manuscript is scanned (Step S30). Specifically, the manuscript is read by the image reading unit 100. Next, it is determined whether an IC tag is provided on the read manuscript (Step S31). When the IC tag is detected on the manuscript (YES at Steps S31), an {one or more} item(s) to be output is/are extracted from the IC tag information (Step S32). Specifically, in order to extract only required items of the IC tag information, the required items are beforehand set up by the IC tag information managing unit 108. Next, the output conditions of the IC tag information are set up at Step S33. Then, at Step S34, image data wherein character attribute is changed according to the output conditions are generated. Specifically, in the case of the text, the output conditions include a font, a font size, and a color, which are beforehand set up.

Next, an amount of overlap between an area of the manuscript and an area of the tag is computed (Step S35). Specifically, the area of the manuscript image is obtained by separating an image area from a background area, and the amount of overlap is computed. The amount of overlap may be defined as an area, or may be defined as a ratio.

Next, at Step S36, the amount of overlap is compared with a predetermined value that is set up at Step S37. If the amount of overlap is greater than the predetermined value (NO at Step S36), the area of the manuscript data is reduced (Step S38) so that the amount of overlap becomes less than the predetermined value. Then, the manuscript image and the image data of the tag information are compounded (Step S39). Next, the image is processed for outputting (Step S40), and the processed image is output (Step S41).

Figure 25:
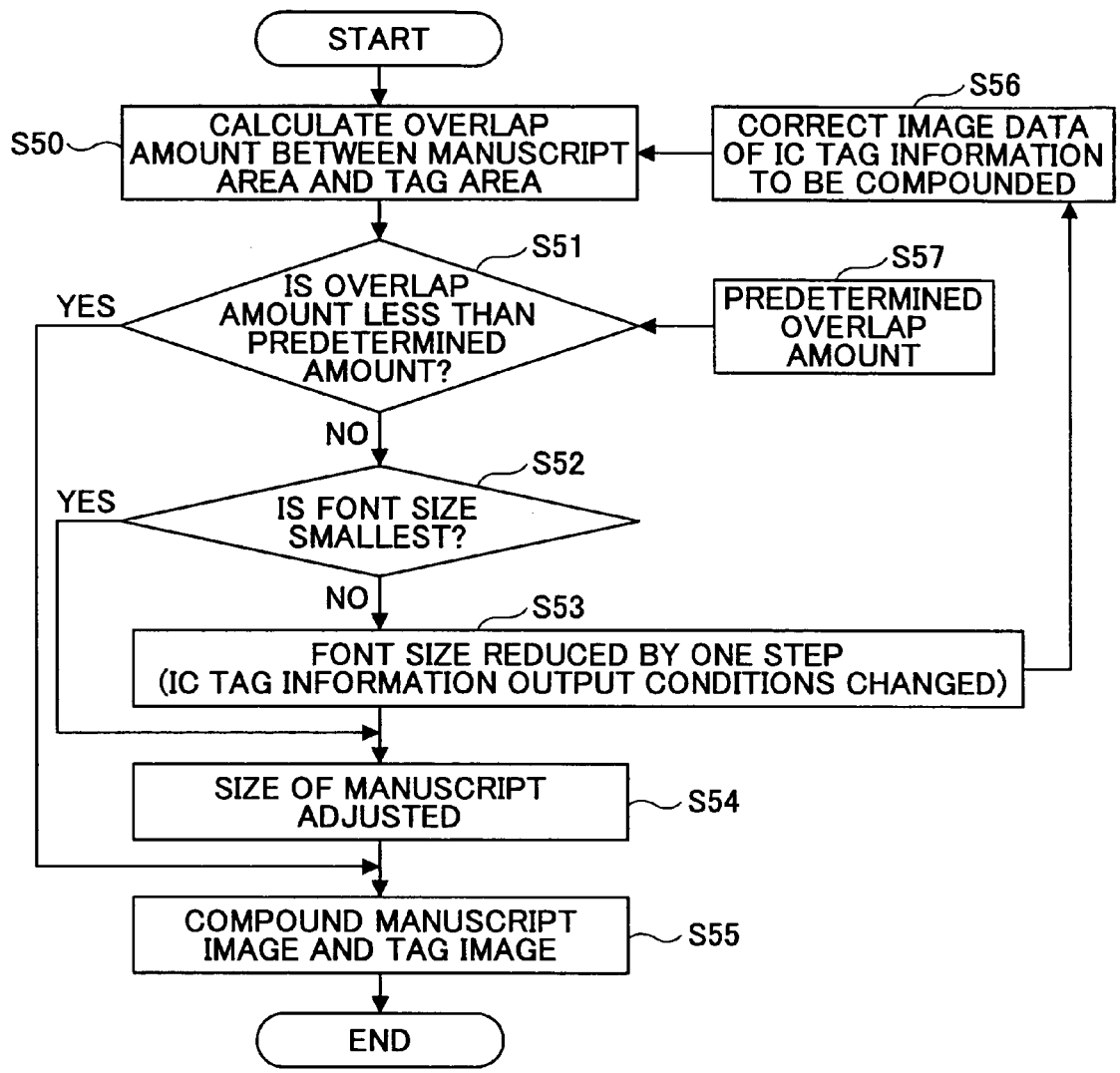
FIG. 25 is a flowchart of operations with the IC tag according to the embodiment of the present invention.

FIG. 25 is a flowchart that describes details of the process enclosed by a dashed line block in FIG. 24.

First, the amount of overlap between the manuscript area and the tag area is computed (Step S50). Next, the amount of overlap is compared with the predetermined value (Step S51) that is set up at Step S57. When the amount of overlap is less than the predetermined value (YES at Step S51), the manuscript image and the tag image are compounded. If, otherwise, the amount of overlap is greater than the predetermined value (NO at Step S51), it is determined whether a font size is the smallest (Step S52). If the font size is the smallest (YES at Step S52), the area of the manuscript is reduced (Step S54), and the manuscript image and the tag image are compounded (Step S55).

Otherwise, if the font size is not the smallest (NO at Step S52), the font size is made smaller by one step (Step S53), and the image data of the IC tag information to be compounded are revised (Step S56). Then, the process of obtaining the amount of overlap is repeated (Step S50), and the subsequent steps are repeated until the amount of overlap becomes smaller than the predetermined value. Then, the manuscript image and the tag information image are compounded (Step S55).

Figure 26:
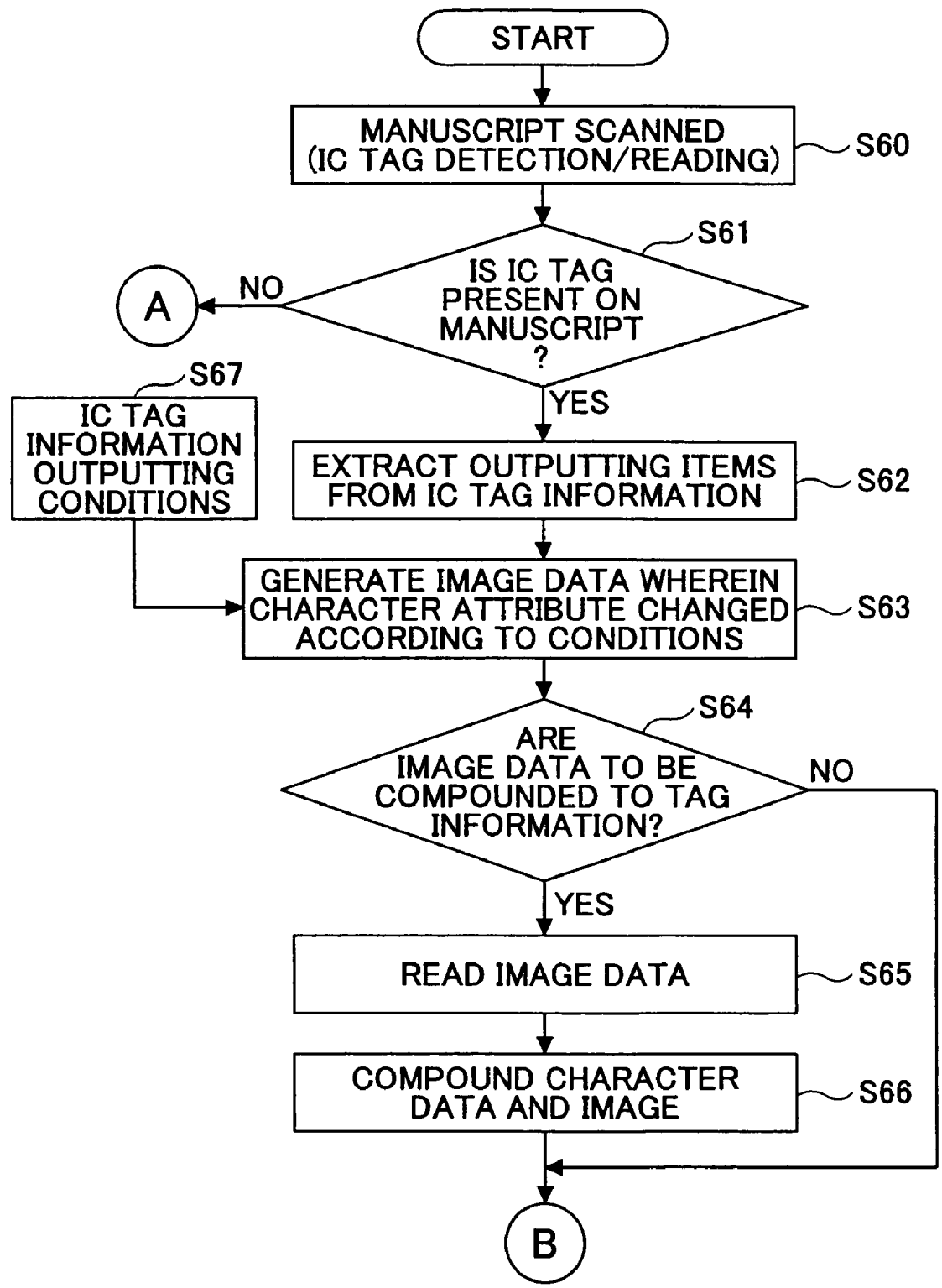
FIG. 26 is a flowchart of operations with the IC tag according to the embodiment of the present invention.
Figure 27:
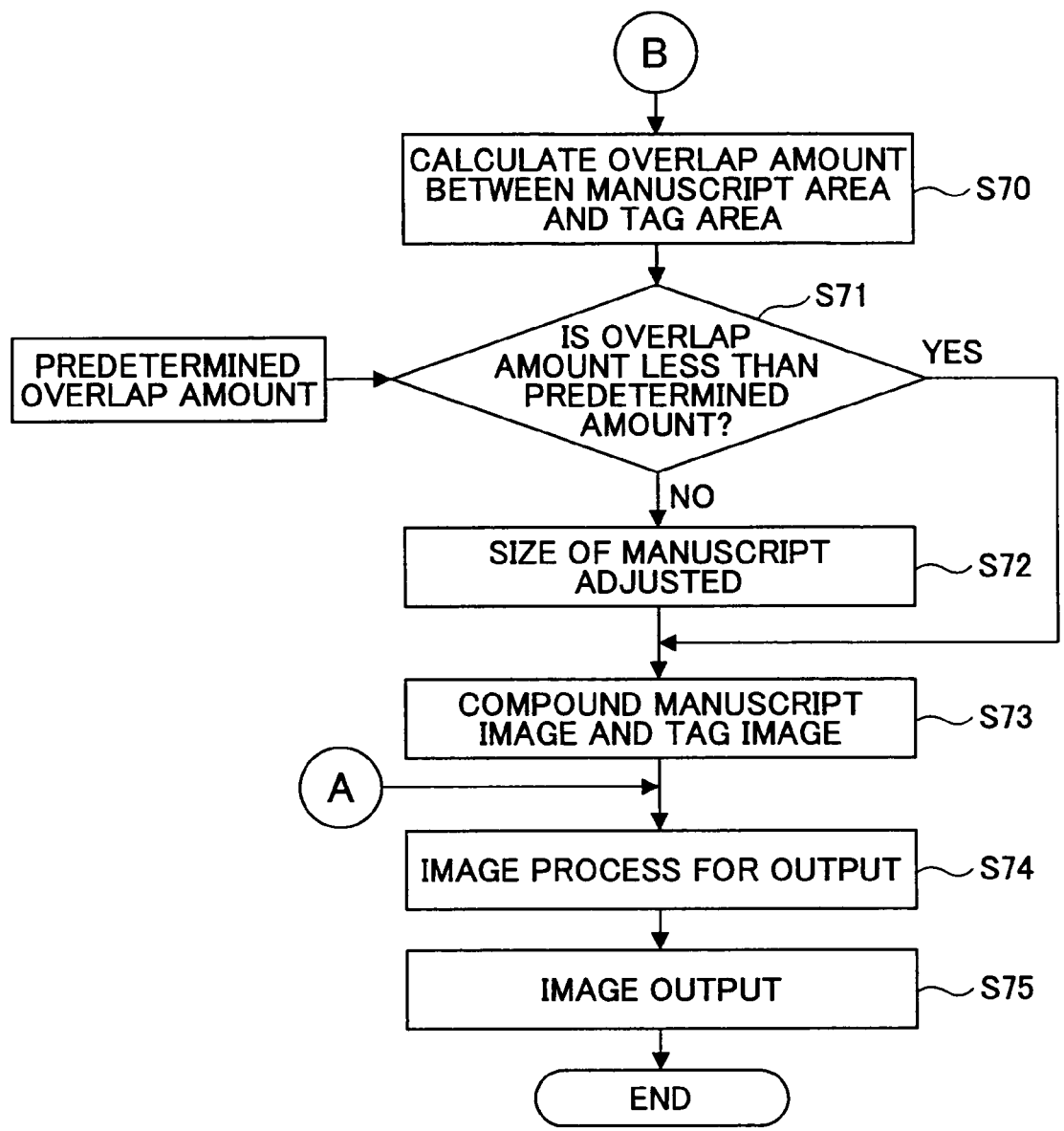
FIG. 27 is a flowchart of operations with the IC tag according to the embodiment of the present invention.

FIG. 26 and FIG. 27 are flowcharts showing a process of changing the character attribute of the IC tag information.

First, the manuscript is scanned (Step S60). Specifically, the image reading unit 100 scans the manuscript in response to directions issued by the user. Next, it is determined whether an IC tag is provided on the manuscript (Step S61). At this time, the IC tag information reading/writing unit 103 detects whether an IC tag is provided on the manuscript when reading the manuscript.

If it is determined that there is no IC tag being provided on the manuscript (NO at Step S61), the image is processed for outputting as it is (Step S74; ref. FIG. 27), and the image is output (Step S75). Otherwise, if it is determined that an IC tag is detected on the manuscript (YES at Step S61), the item(s) beforehand set up for outputting are extracted from the IC tag information (Step S62), and the image data, wherein the character attribute is changed according to the output conditions of the IC tag information set up at Step S67, are generated (Step S63).

Next, it is determined whether it is necessary to compound the IC tag information and the image data generated at Step S63 (Step S64). If it is determined that there is no need for compounding (NO at Step S64), the process progresses to Step S70 in FIG. 27, where the amount of overlap between the manuscript area and the tag area is calculated. Otherwise, if it is determined that compounding of the image data is required (YES at Step S64), the image data are read from the storage unit 105 (Step S65), the character data and the image data are compounded (Step S66), and the amount of overlap between the manuscript area and the tag area is computed (Step S70). Since the process after Step S70 is the same as that of Steps S35 through S41 in FIG. 24, descriptions thereof are not repeated.

Figure 28:
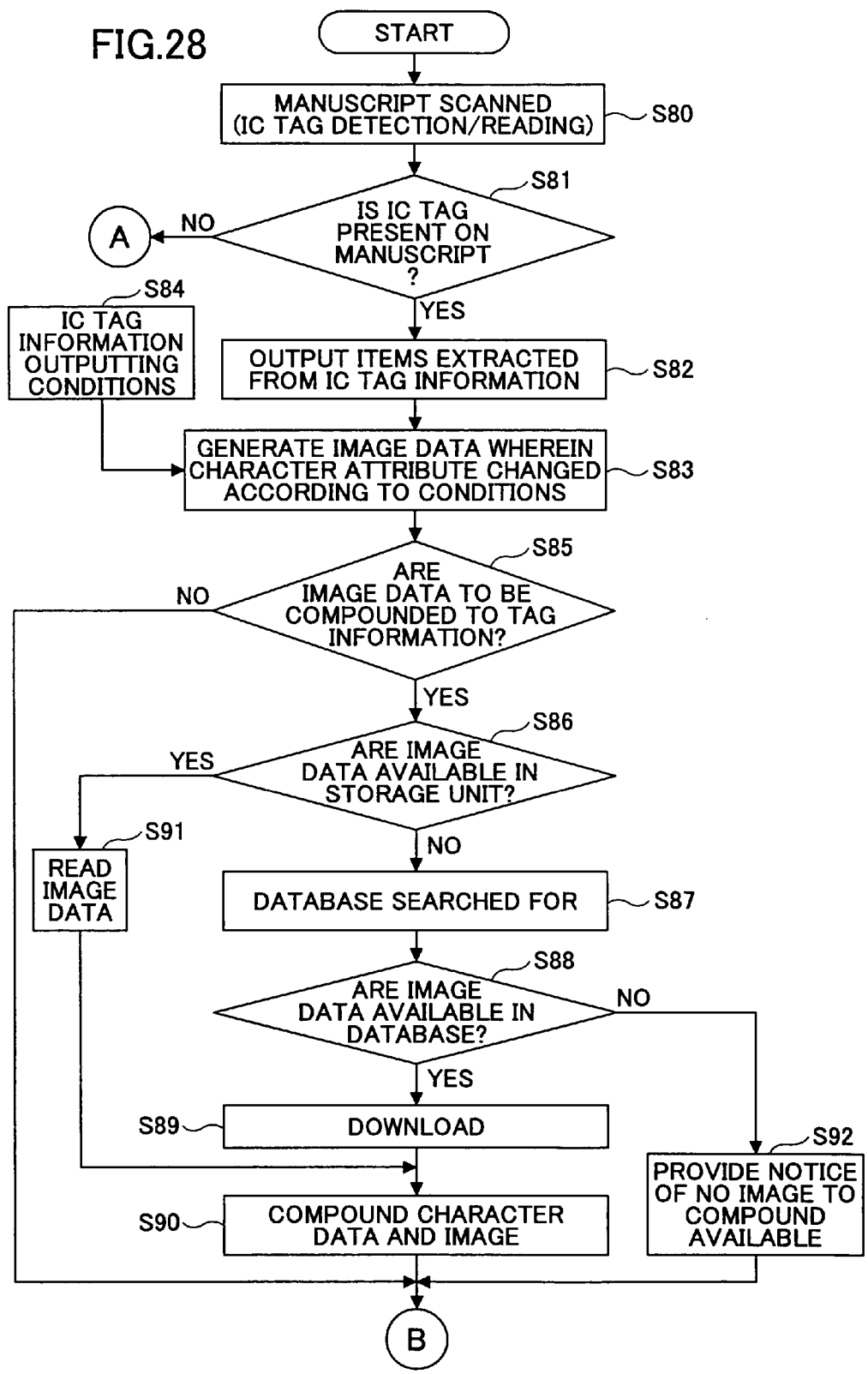
FIG. 28 is a flowchart of operations with the IC tag according to the embodiment of the present invention.

FIG. 28 is a flowchart showing a process of generating an image of the IC tag information. First, the manuscript is scanned (Step S80). Specifically, the image reading unit 100 scans the manuscript in response to directions issued by the user. Next, it is determined whether an IC tag is provided on the manuscript (Step S81). At this time, the IC tag information reading/writing unit 103 detects whether an IC tag is provided on the manuscript when reading the manuscript.

When it is determined that there is no IC tag on the manuscript (NO at Step S81), the image is processed for outputting as it is (Step S74) as shown in FIG. 27. Then, the image is output (Step S75). Otherwise, if it is determined that an IC tag is provided on the manuscript (YES at Step S81), items to be output are extracted from the IC tag information according to the extraction items beforehand set up (Step S82). Then, the image data, wherein the character attribute is changed according to the output conditions of the IC tag information predetermined at Step S84, are generated (Step S83).

Next, it is determined whether image data and the IC tag information are to be compounded (Step S85). If compounding of the image data is not required (NO at Step S85), the process shown in FIG. 27 is performed. Otherwise, if it is determined that compounding of the image data is required (YES at Step S85), it is determined whether the image data are available (Step S86). If the image data are available (YES at Step S86), the image data are read (Step S91), and the character data and the image are compounded (Step S90).

Otherwise, if the image data are not available (NO at Step S86), the database is searched for the image data (Step S87); and it is determined whether the image data are available in the database (Step S88). When the image data are not available in the database (NO at Step S88), the user is notified that there are no image data to compound (Step S92).

If, otherwise, the image data are in the database (YES at Step S88), the image data are downloaded from the database (Step S89), and the image data and the character data are compounded (Step S90).

Figure 29:
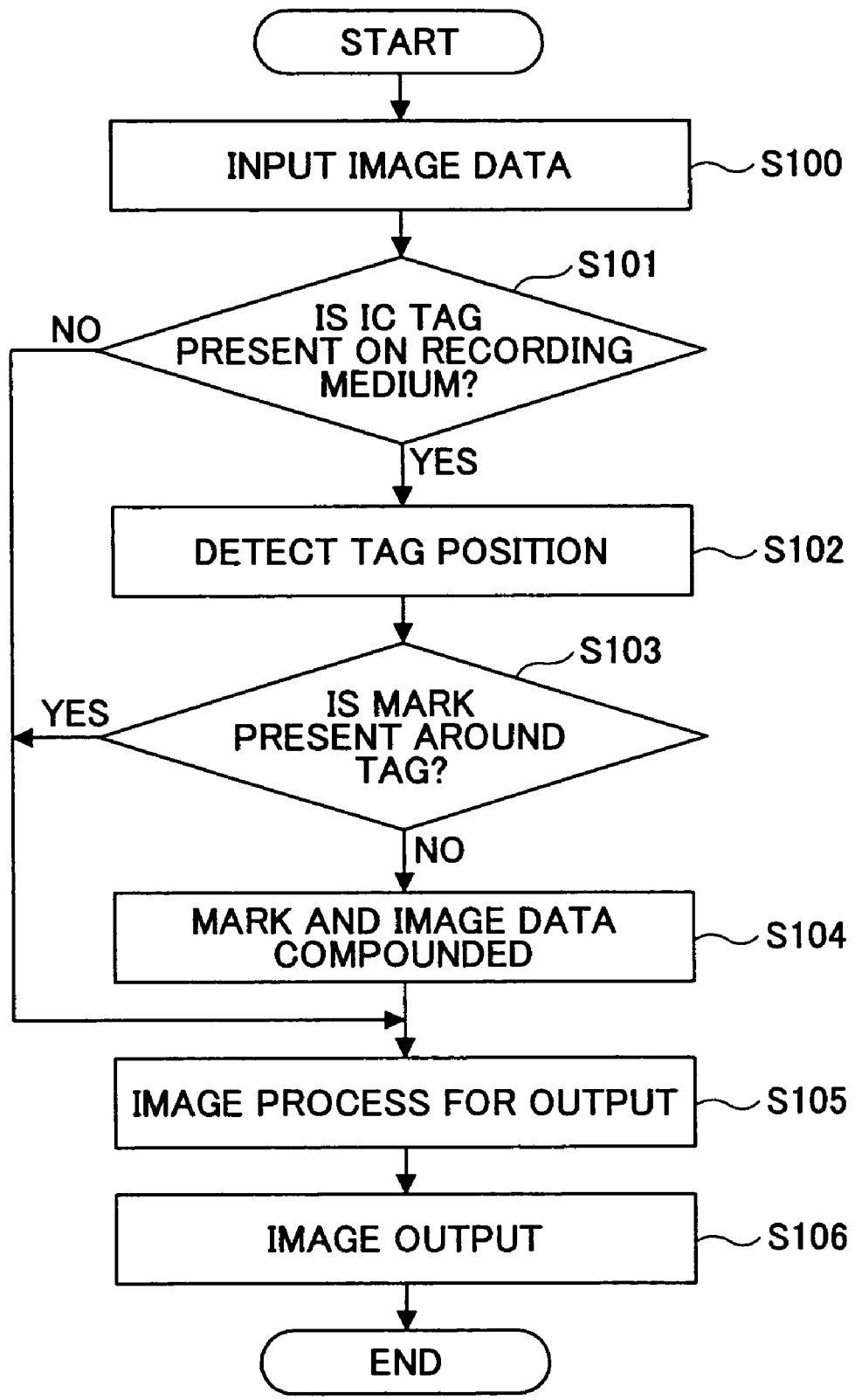
FIG. 29 is a flowchart of operations with the IC tag according to the embodiment of the present invention.

FIG. 29 is a flowchart showing a process of recording an image onto the recording medium to which an IC tag is provided.

First, image data are input (Step S100). Next, it is determined whether an IC tag is provided on the recording medium (Step S101). If there is no IC tag being provided on the recording medium (NO at Step S101), the image is processed for outputting as it is (Step S105), and then image is output (Step S106).

If, otherwise, it is determined that an IC tag is provided on the recording medium (YES at Step S101), the installation position of the tag is detected (Step S102). Then, it is determined whether there is a mark being provided around the IC tag (Step S103). If there is a mark (YES at Step S103), the image is processed for outputting as it is (Step S105), and the image is output (Step S106). If, otherwise, there is no mark being provided around the IC tag (NO at Step S103), a mark is compounded with the image data (Step S104), and Steps S105 and S106, as described above, are carried out.

Figure 30:
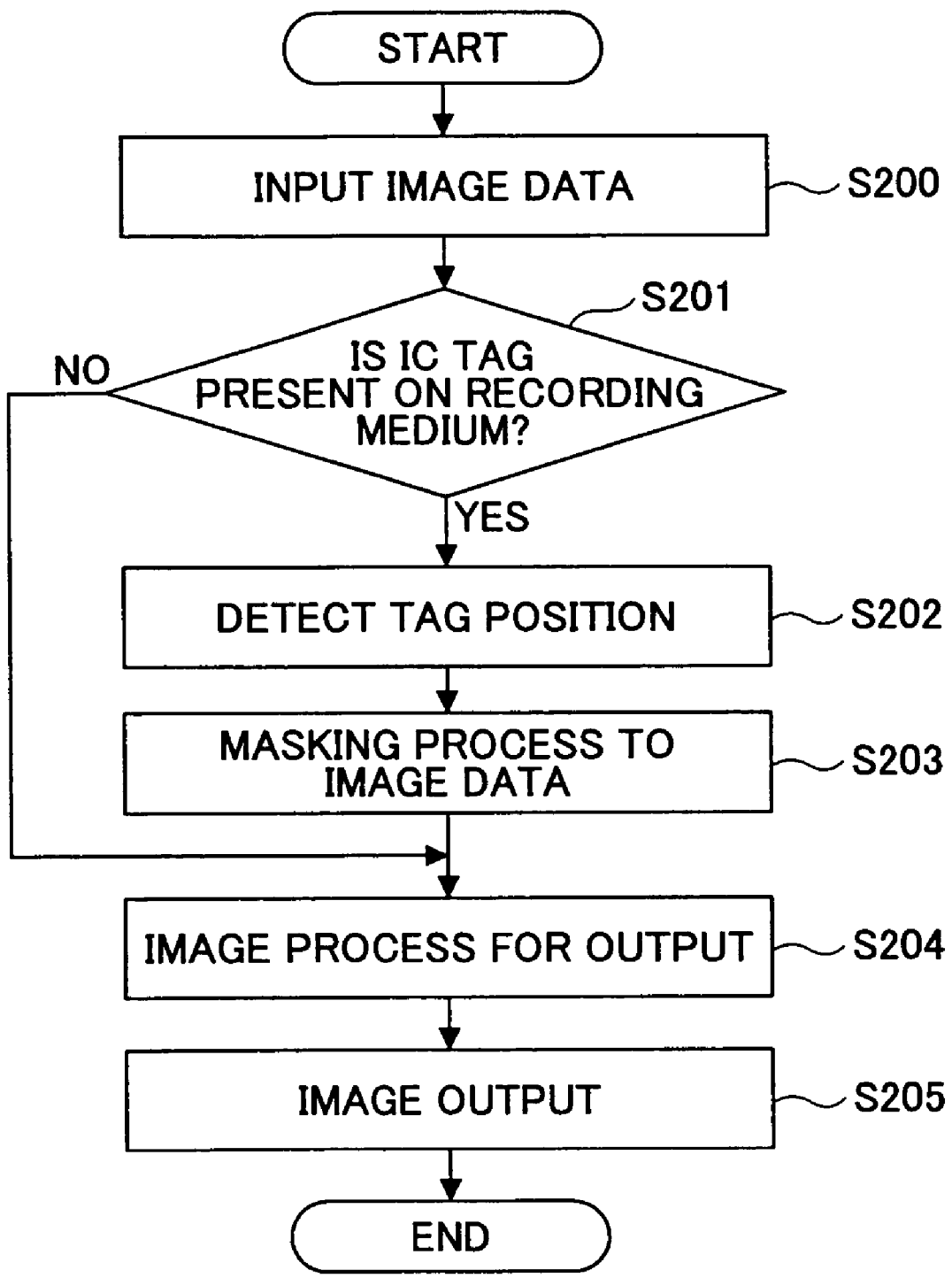
FIG. 30 is a flowchart of operations with the IC tag according to the embodiment of the present invention.

FIG. 30 is a flowchart showing a process of preventing writing an image in the installation position of the IC tag.

First, image data are input (Step S200). Next, it is determined whether an IC tag is provided on the recording medium (Step S201). When there is no IC tag on the recording medium (NO at Step S201), the image is processed for outputting (Step S204), and the image is output (Step S205). Otherwise, if it is determined that an IC tag is provided on the recording medium (YES at Step S201), the installation position of the IC tag is detected, and a masking process is performed on the image data (Step S203). Then, the image is processed for outputting (Step S204), and the image is output (Step S205).

Figure 31:
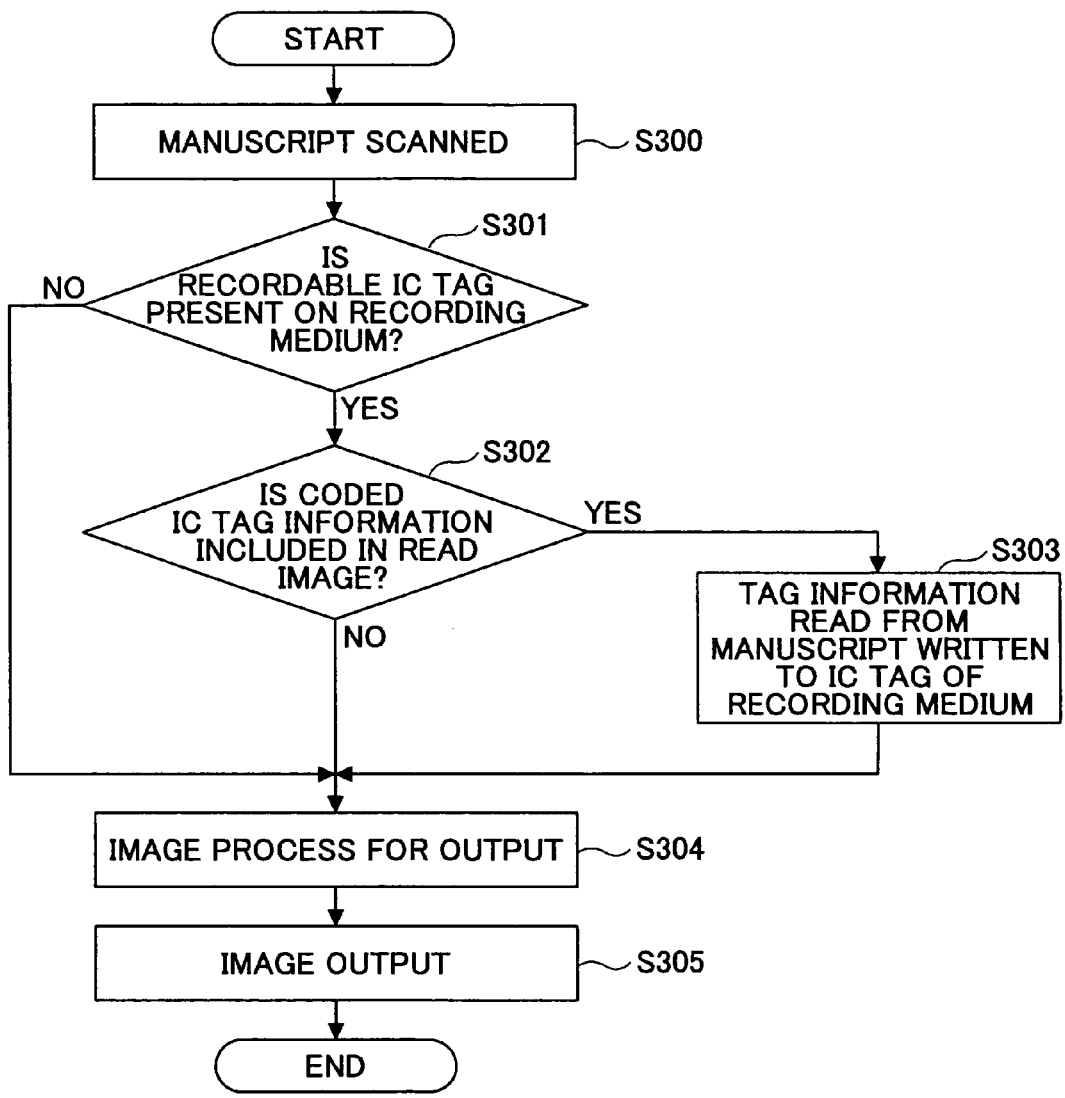
FIG. 31 is a flowchart of operations with the IC tag according to the embodiment of the present invention.

FIG. 31 is a flowchart showing a process carried out when the IC tag information is recorded on the manuscript image in the form of, e.g., a bar code and digital watermark.

First, the manuscript is scanned by the image reading unit 100 (Step S300). Next, it is determined whether an IC tag that is recordable is provided on the recording medium (Step S301). If there is no IC tag provided (NO at Step S301), the image is processed for outputting (Step S304), and the image is output (Step S305). Otherwise, if there is a recordable IC tag provided on the recording medium (YES at Steps S301), it is determined whether coded IC tag information is included in the read image (Step S302).

If there is no coded IC tag information included (NO at Step S302), the image is processed for outputting as it is (Step S304), and the image is output (Step S305). Otherwise, if there is the coded IC tag information included (YES at Step S302), the IC tag information is read from the manuscript, and is written into the IC tag on the recording medium (Step S303). Then, the image is processed for outputting (Step S304), and the image is output (Step S305).

Figure 32:
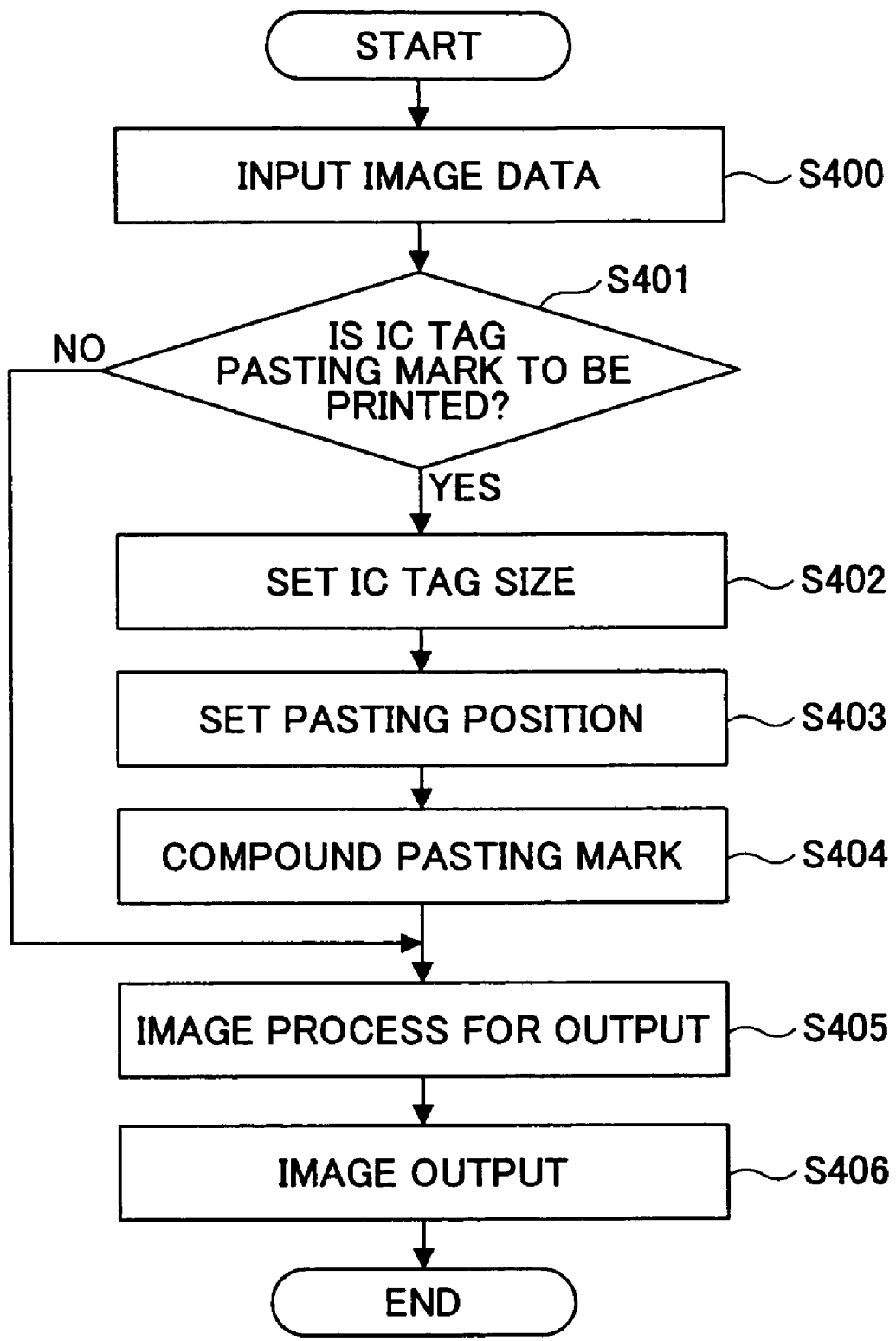
FIG. 32 is a flowchart of operations with the IC tag according to the embodiment of the present invention.

FIG. 32 is a flowchart showing a process in the case of printing an IC tag pasting mark. First, image data are input (Step S400). Then, it is determined whether a pasting mark of an IC tag is to be printed (Step S401). If printing is not required (NO at Step S401), the image is processed for outputting as it is (Step S405), and the image is output (Step S406). If, otherwise, printing the IC tag pasting mark is required (YES at Step S401), an IC tag size is set up (Step S402), a pasting position is set up (Step S403), and the pasting mark is compounded (Step S404). Then, the image is processed for outputting at S304, and the image is output at S305.

According to the embodiment of the present invention, the image reading system includes the conversion unit for converting all or a part of the tag information into the coded image information. The conversion preferably is into a bar code, or into a digital watermark such that the converted tag information is embedded in the image data that are read. In this manner, the information held by the IC tag provided on the manuscript is contained in the output image in the form of the bar code or the digital watermark. Accordingly, the information recorded on the IC tag is properly reproduced in the copied image. Further, since the tag information is held as the coded information, the tag information can be easily acquired as electronic data, enabling the efficient management of documents.

As described above, since the dimensions of the manuscript area or the tag information area, as applicable, are adjusted so that the amount of overlap between the image information area and the tag information area becomes less than the predetermined amount, the IC tag information can be compounded intact, i.e., without its dimensions being unnecessarily adjusted, without its image being crushed, and without its legibility being degraded.

As for the text information of the IC tag information, the attribute of the characters used in the text is adjustable. Accordingly, when the amount of overlap is greater than the predetermined value, a smaller font is selected such that the legibility of the tag information is maintained. This helps alleviate the degree of size adjustment (reduction) of the manuscript image, providing a well-balanced compounded image as a result.

Further, since the output form (e.g., the size, the color, the font, the style and the background color of the characters) of a selected part of the tag information can be changed, the selected part matching predetermined conditions, the operability of the documents management is improved.

Further, image data (an icon) corresponding to the contents of the tag information can be held by the storage of the system. For example, when an icon number is contained in the tag information, the icon (image data) corresponding to the icon number is read from the storage, and the image data of the icon are compounded with the image information. Further, when there is no image information corresponding to the icon number available in the storage, a connection is established to the network so that the image is searched for and downloaded. The image obtained through the network is then compounded with the image of the tag information. In this way, visual recognition is facilitated compared with text-only information, and the efficiency of the documentation management is raised. As described, since the IC tag does not have to store the image data, even if storage capacity of the IC tag is small, the effect of the embodiment can be acquired.

Further, since the area that contains the area where the IC tag is provided on the manuscript, or the mark that specifies the presence of the IC tag is detected, and the detected area is replaced by other data, an unnecessary IC tag that is copied when the manuscript with the IC tag is copied can be erased. In this way, the appearance of the output manuscript can be improved.

Further, in the case where two or more pages are to be copied, and an IC tag is provided only in some pages (for example, the first page), the user can select whether compounding is to be carried out as for the pages without an IC tag such that the information held by the IC tag can be printed on the page(s) without the IC tag. In this manner, the management information is readable on any page without having to open the page (for example, the first page) wherein the IC tag is provided. Accordingly, the information contained in the IC tag can be more efficiently recognized.

Further, when a manuscript is an output wherein the IC tag information is presented by a coded image, the image reading system of the embodiment, being capable of writing into an IC tag, reads the information coded in a form such as a bar code, and the read information is recorded on the IC tag. In this way, a document that cannot be managed by an IC tag can be made manageable by an IC tag, i.e., the IC tag information attached to the original manuscript can be inherited. Accordingly, time and effort for inputting the management information of the document can be dispensed with, raising the efficiency of document management.

Further, since the position of the IC tag is detected in addition to the presence of the IC tag, and it is arranged such that the image is not to be written in the installation position of the IC tag, even if the IC tag is separated from the manuscript for recycling, the information on the manuscript is not lost.

Further, since the mark is printed, the mark indicating that an IC tag is provided in the area that contains the IC tag, a situation where the presence of the IC tag is overlooked, and the IC tag information is not effectively used can be avoided. Furthermore, a problem such as an infringement of privacy (e.g., personal identification) without knowledge that may arise due to owning a document with an IC tag can be avoided.

Further, the mark indicating the installation position corresponding to the size of the tag to be provided is compounded and output; in this way, when an IC tag is to be provided after outputting the image, the efficiency of installing the IC tag after outputting the image is improved.

Further, since the history information that shows that it is copied is added to the tag information compounded with the image to be output, the flow of documents can be efficiently grasped, improving secrecy keeping, document management, etc.

Further, the mark indicating that the image data (that is, the coded information on the IC tag) are compounded, is compounded with the read image and output. For this reason, documents with and without a coded image can be easily discriminated, improving the efficiency of document management.

Further, the detecting unit detects the mark indicating that the image information that is the coded IC tag information is included; and when the mark is detected, the coded image is detected out of the image, the data are acquired, and the data are written into the IC tag by the writing unit. Accordingly, documents with and without a coded image can be easily discriminated, improving the efficiency of document management.

Further, since the history information indicating that the manuscript is copied is recorded in the information held by the IC tag of the manuscript, when copying the manuscript with the IC tag onto a recording medium with an IC tag, it becomes possible to grasp the flow of documents, improving the efficiency of document management, such as secrecy keeping and secrecy management.

Further, the present invention is not limited to these embodiments, but variations and modifications may be made without departing from the scope of the present invention.

The present application is based on Japanese Priority Application No. 2004-319838 filed on Nov. 2, 2004 with the Japanese Patent Office, the entire contents of which are hereby incorporated by reference.

What is claimed is:

1. An image reading system, comprising:
    an image information reading unit configured to read optical information on a manuscript;
    an image outputting unit configured to output the optical information read by the image information reading unit to a recording medium;
    an IC tag information reading unit including a plurality of antennas aligned in a direction of horizontal scanning of the reading unit and configured to read IC tag information held by an IC tag provided on the manuscript;
    an IC tag information outputting unit configured to output the IC tag information read by the IC tag information reading unit to the recording medium;
    a conversion unit configured to convert the IC tag information into coded image data; and
    a control unit configured to control outputting of the coded image data.

2. An image reading system, comprising:
    an image information reading unit configured to read optical information on a manuscript
    an image outputting unit configured to output the optical information read by the image information reading unit to a recording medium;
    a tag information detecting unit including a plurality of antennas aligned in a direction of horizontal scanning of the reading unit and configured to detect whether tag information embedded as an image is provided on the manuscript; and
    a recording unit configured to record the tag information on an IC tag according to a detection result of the tag information detecting unit.

3. The image reading system as claimed in claim 1, wherein the coded image data are one of a bar code and digital watermark data.

4. The image reading system as claimed in claim 1, further comprising:
    a compounding unit configured to compound the optical information of the manuscript and the coded image data for outputting to the recording medium; and
    a calculating unit configured to compute an amount of overlap between an area of the optical information and an area of the image data when the area of the optical information and the area of the image data are overlapped,
    wherein dimensions of one of the area of the optical information and the area of the image data are adjusted according to a calculation result by the calculating unit.

5. The image reading system as claimed in claim 1, further comprising:
    a character attribute changing unit configured to change an attribute of characters held by the IC tag information,
    wherein the conversion unit converts the IC tag information into the image data, the attribute of the characters of which has been changed by the character attribute changing unit.

6. The image reading system as claimed in claim 4, wherein the dimensions of the areas are adjusted by the calculating unit according to the calculation result of the amount of overlap between the area of the image data, the attribute of the character of which has been changed, and the area of the optical information.

7. The image reading system as claimed in claim 1, wherein a form of the output to the recording medium of the image data is changed depending on the IC tag information held by the IC tag.

8. The image reading system as claimed in claim 7, wherein the form of the output is changed by one or more of changing an attribute of characters, adding different image data to the coded image data that are obtained by converting the IC tag information, and replacing the coded image data with different image data.

9. The image reading system as claimed in claim 8, wherein the image reading system acquires the different image data from a database that is connected to the image reading system through a network, the database holding the different image data.

10. The image reading system as claimed in claim 1, further comprising:
an area detecting unit configured to detect an area that includes one of an IC tag provided on the manuscript and a mark that indicates presence of the IC tag,
wherein information in the area detected by the area detecting unit is erased, or overwritten by other data.

11. The image reading system as claimed in claim 1, wherein the conversion unit adds history information that includes information indicating at least that the manuscript is copied when converting the IC tag information into the coded image data.

12. The image reading system as claimed in claim 1, further comprising:
an installation detecting unit configured to determine whether an IC tag is installed on the recording medium, and for determining the installation position of the IC tag,
wherein an image is not written in a predetermined area that includes the installation position of the IC tag as determined by the installation detecting unit.

13. The image reading system as claimed in claim 12, wherein a mark indicating a presence of the IC tag is printed in the predetermined area of the recording medium, if the detecting unit determines that the IC tag is present.

14. The image reading system as claimed in claim 1, further comprising:
a user interface configured to display a menu configured to receive an input selecting an output format of the coded image data corresponding to the IC tag information.

15. The image reading system as claimed in claim 14, wherein the menu is configured to accept an input to modify a color of the output coded image data based on a secrecy level of the manuscript which is stored in the IC tag.

16. The image reading system as claimed in claim 1, wherein the coded image data output from the control unit includes at least one of a classification number, date, author, revision date, output machine and secrecy level.

17. The image reading system as claimed in claim 1, wherein the plurality of antennas are provided at a position between a feed roller and the reading unit.

18. The image reading system as claimed in claim 1, wherein the plurality of antennas are provided at an output of a feed tray in close proximity to a feed roller configured to feed paper from the feed tray.

19. An image reading system, comprising:
means for reading optical information on a manuscript;
means for outputting the optical information read by the means for reading to a recording medium;
an IC tag information reading unit including a plurality of antennas aligned in a direction of horizontal scanning of the means for reading and configured to read IC tag information held by an IC tag provided on the manuscript;
means for outputting the IC tag information read by the IC tag information reading unit to the recording medium;
means for converting the IC tag information into coded image data; and
means for controlling outputting of the coded image data.

20. The image reading system as claimed in claim 19, wherein the means for reading is different from the IC tag information reading unit, and the IC tag information reading unit is configured to read the IC tag information before the manuscript enters the means for reading.

* * * * *